United States Patent
Wu et al.

(10) Patent No.: US 11,445,443 B2
(45) Date of Patent: Sep. 13, 2022

(54) METHOD, USER EQUIPMENT, BASE STATION, AND READABLE STORAGE MEDIUM FOR TRANSMITTING WAKE-UP SIGNAL

(71) Applicant: Samsung Electronics Co., Ltd., Suwon-si (KR)

(72) Inventors: Min Wu, Beijing (CN); Feifei Sun, Beijing (CN); Miao Zhou, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/586,259

(22) Filed: Sep. 27, 2019

(65) Prior Publication Data
US 2020/0107267 A1    Apr. 2, 2020

(30) Foreign Application Priority Data

Sep. 27, 2018  (CN) .......................... 201811133789.2
Nov. 1, 2018  (CN) .......................... 201811296765.9

(51) Int. Cl.
*H04W 68/10*    (2009.01)
*H04W 76/28*    (2018.01)
*H04W 52/02*    (2009.01)

(52) U.S. Cl.
CPC ... *H04W 52/0229* (2013.01); *H04W 52/0219* (2013.01); *H04W 68/10* (2013.01); *H04W 76/28* (2018.02)

(58) Field of Classification Search
CPC . H04W 52/0229; H04W 68/10; H04W 76/28; H04W 52/0219; Y02D 30/70
See application file for complete search history.

(56) References Cited

U.S. PATENT DOCUMENTS

2014/0050133 A1    2/2014  Jafarian et al.
2014/0112221 A1    4/2014  Verger et al.
(Continued)

FOREIGN PATENT DOCUMENTS

| CN | 106550435 A | 3/2017 |
|---|---|---|
| EP | 2472935 A1 | 7/2012 |
| KR | 10-1829768 B1 | 2/2018 |
| WO | 2018/128595 A1 | 7/2018 |

OTHER PUBLICATIONS

Intel Corporation, UE-group wake-up signal for eMTC, 3GPP TSG RAN WG1 Meeting #94, R1-1808655, Aug. 11, 2018, Gothenburg, Sweden, See sections 2, 4-5.

(Continued)

*Primary Examiner* — Un C Cho
*Assistant Examiner* — Lalita W Pace
(74) *Attorney, Agent, or Firm* — Jefferson IP Law, LLP

(57) ABSTRACT

Embodiments of the present application provide a method, a user equipment (UE), a base station, and a readable storage medium for transmitting a wake-up signal (WUS). The method is performed by the UE, and includes: receiving configuration information of a UE group WUS; determining the WUS corresponding to the UE group to which the UE belongs according to the configuration information of the UE group WUS; and monitoring the WUS corresponding to the UE group to which the UE belongs. The solutions of the embodiments of the present application may further reduce power consumption of the UE compared with the prior art.

13 Claims, 13 Drawing Sheets

(56) References Cited

U.S. PATENT DOCUMENTS

| | | | | |
|---|---|---|---|---|
| 2019/0312758 | A1* | 10/2019 | Liu | H04W 52/0216 |
| 2019/0349856 | A1* | 11/2019 | Liu | H04W 52/0229 |
| 2020/0022082 | A1* | 1/2020 | Ljung | H04W 68/005 |
| 2020/0029302 | A1* | 1/2020 | Cox | H04W 52/0229 |
| 2020/0053645 | A1* | 2/2020 | Charbit | H04W 68/10 |
| 2020/0092808 | A1* | 3/2020 | Beale | H04W 52/0235 |
| 2020/0229095 | A1* | 7/2020 | Shrestha | H04W 52/0235 |
| 2020/0280959 | A1* | 9/2020 | Sharma | H04W 52/0235 |
| 2020/0396687 | A1* | 12/2020 | Hwang | H04W 52/0235 |
| 2021/0037465 | A1* | 2/2021 | Mazloum | H04W 68/005 |
| 2021/0037469 | A1* | 2/2021 | Astrom | H04W 52/0229 |
| 2021/0168716 | A1* | 6/2021 | Mi | H04W 76/28 |

OTHER PUBLICATIONS

Mediatek Inc., UE-Group WUS in NB-IoT, 3GPP TSG RAN WG1 Meeting #94, R1-1808959, Aug. 10, 2018, Gothenburg, Sweden, See sections 2-5.

Qualcomm Incorporated, Summary of 6.2.1.1 UE group MWUS, 3GPP TSG RAN WG1 Meeting #94, R1-1809521, Aug. 21, 2018, Gothenburg, Sweden, See sections 2.1-2.3.

International Search report dated Jan. 6, 2020, issued in International Application No. PCT/KR2019/012466.

Extended European Search Report dated Sep. 27, 2021, issued in a counterpart European Application No. 19866394.0-1205 /3841797.

Qualcomm Incorporated; Remaining issues on WUS for MTC; 3GPP TSG RAN WG1 Meeting #93 R1-1807104; May 20, 2018, Busan, Korea.

Huawei, HiSilicon; Feature lead summary of Wake-up signal configurations and procedures in NBIoT; 3GPP TSG RAN WG1 Meeting #93 R1-1807471; May 22, 2018, Busan, Korea.

Ericsson; Feature summary of 6.2.2.1 UE-group wake-up signal; 3GPP TSG-RAN WG1 Meeting #94 R1-1809532; Aug. 22, 2018, Gothenburg, Sweden.

A Decision on Grant dated Jan. 27, 2022, issued in a counterpart Korean Application No. 10-2021-7001007.

Chinese Office Action dated May 25, 2022, issued in a counterpart Chinese Application No. 201811296765.9.

* cited by examiner

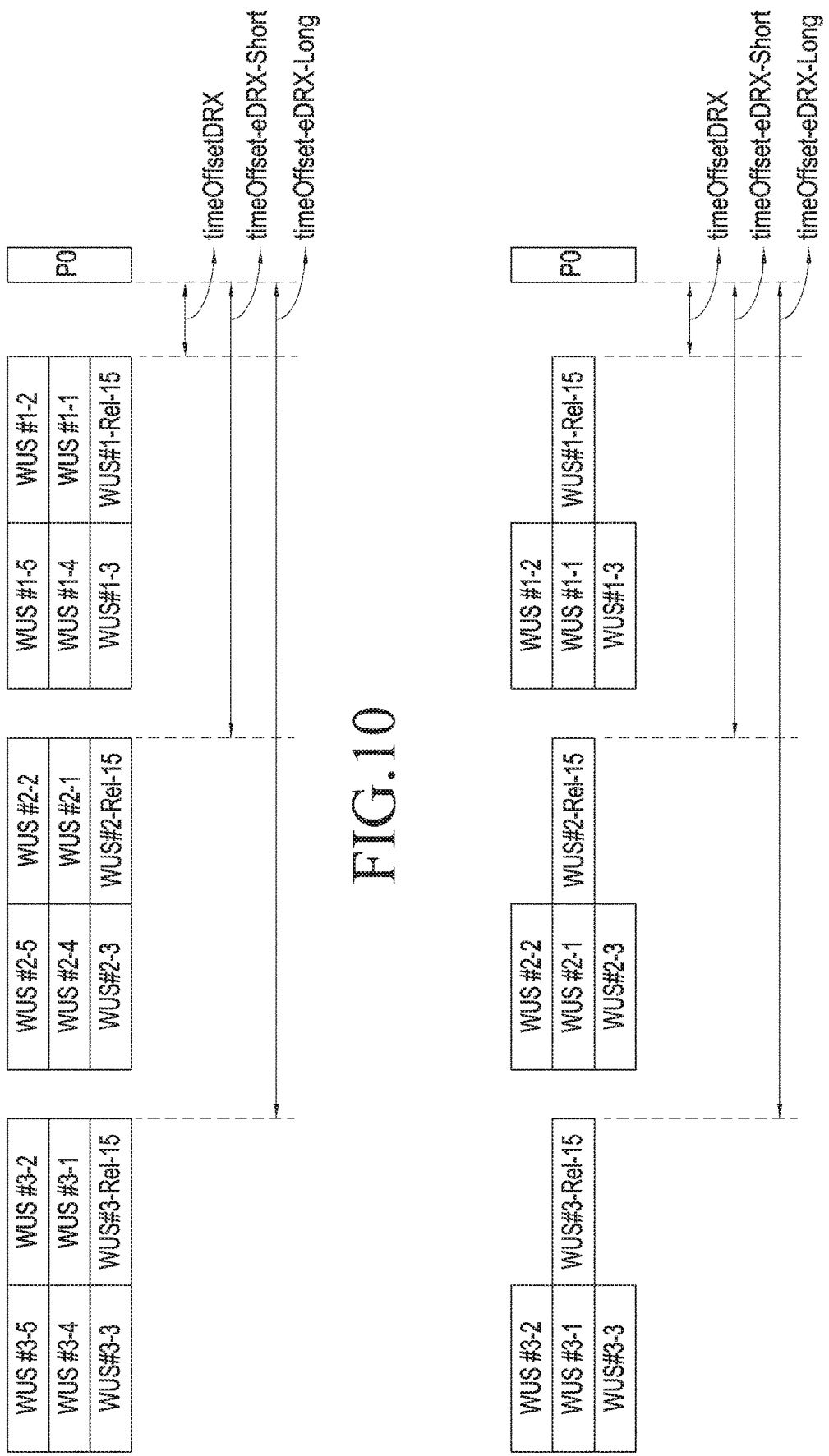

METHOD, USER EQUIPMENT, BASE STATION, AND READABLE STORAGE MEDIUM FOR TRANSMITTING WAKE-UP SIGNAL

CROSS-REFERENCE TO RELATED APPLICATION(S)

This application is based on and claims priority under 35 U.S.C. § 119(a) of a Chinese patent application number 201811133789.2, filed on Sep. 27, 2018, in the Chinese Patent Office, and of a Chinese patent application number 201811296765.9, filed on Nov. 1, 2018, in the Chinese Patent Office, the disclosure of each of which is incorporated by reference herein in its entirety.

TECHNICAL FIELD

The present application relates to the field of communications technology, and in particular, to a method, a user equipment, a base station, and a readable storage medium for transmitting a wake-up signal.

BACKGROUND

In Rel-15 (3GPP's first complete 5G new air interface standard) LTE system, a wake-up signal (WUS) is introduced for machine-type communication (MTC) and narrow band internet of things (NB-IOT), to reduce power consumption of a user equipment (UE) in a radio resource control (RRC) idle mode.

The WUS is used to indicate whether there is a paging occasion (PO) in a paging cycle. When a cell system information block includes configuration information of the WUS, in each paging cycle, a UE having WUS capability is changed from monitoring a physical control channel of the PO to monitoring the WUS. For an MTC UE, it is changed from monitoring MPDCCH (MTC physical downlink control channel) of the PO to monitoring MWUS (MTC wake-up signal), wherein MWUS and MPDCCH belong to a same narrow band; for a NB-IOT UE, it is changed from monitoring NPDCCH (NB-IOT physical downlink control channel) of the PO to monitoring WUS, wherein WUS and NPDCCH belong to a same carrier. If the UE (including the MTC UE and the NB-IOT UE) has monitored MWUS/WUS, then the UE needs to further monitor the physical control channel of the PO in the paging cycle; if the UE has not monitored MWUS/WUS, the UE may directly enter into a sleep mode, i.e., a hibernate mode, without needing to monitor to the physical control channel of the PO in this paging cycle. Since the power consumption for monitoring WUS (detecting a physical signal) is lower than that for monitoring the physical control channel (decoding physical channel) of the PO, the introduction of WUS may significantly reduce the power consumption of the UE in the RRC-Idle mode, thereby extending battery life, which is very beneficial for MTC UE and NB-IOT UE based on IOT services.

The paging messages of the UE mainly include two types. The first type is a paging message from a radio access network (RAN), which mainly includes information, such as system information updating EWTS (earthquake and tsunami warning system) indicator and a CMAS (commercial mobile alert service) indicator; the second type is a paging message from a core network (CN), which mainly includes a paged UE ID (i.e., SAE-temporary mobile subscriber identity (S-TMSI) or international mobile subscriber identification number (IMSI)), and an indicator which indicates whether the paging is from a packet switch (PS) domain or a circuit switch (CS) domain. For the paging message from the RAN side, all idle UEs in the cell need to receive it; for the paging message from the CN side, only the paged UE needs to receive it, and other UEs do not need to receive it.

If the paging channel only includes a paging message from the CN side, this paging channel is meaningless to other UEs except for the paged UE, and the power consumption of the other UEs used to monitor and receive the paging channel is actually unnecessary. That is a key research direction how to avoid or reduce this unnecessary power consumption.

SUMMARY

The purpose of the present application aims to solve at least one of the above technical defects, and the technical solutions adopted by the present application are as follow:

In a first aspect, the present application provides a method for transmitting a wake-up signal (WUS), which is performed by a UE, and the method includes:

receiving configuration information of a UE group WUS;

determining the WUS corresponding to the UE group to which the UE belongs according to the configuration information of the UE group WUS; and monitoring the WUS corresponding to the UE group to which the UE belongs.

In a second aspect, the present application provides a method for transmitting a wake-up signal WUS, which is performed by a base station, and the method includes:

transmitting configuration information of a UE group WUS;

transmitting the WUS corresponding to the UE group to which the corresponding UE belongs according to the UE corresponding to paging information to be transmitted.

In a third aspect, the application provides a user equipment, wherein the user equipment includes:

a configuration information receiving module, configured to receive configuration information of a UE group WUS;

a WUS determining module, configured to determine the WUS corresponding to the UE group to which the UE belongs according to the configuration information of the UE group WUS;

a WUS monitoring module, configured to monitor the WUS corresponding to the UE group to which the UE belongs, In a fourth aspect, the application provides a base station, the base station including:

a configuration information transmitting module, configured to transmitting configuration information of a UE group WUS;

a WUS transmitting module, configured to transmit the WUS corresponding to the UE group to which the corresponding UE belongs according to the UE corresponding to paging information to be transmitted.

In a fifth aspect, the application provides an electronic device, wherein the electronic device includes a memory and a processor;

the memory stores a computer instruction;

the processor is configured to invoke the computer instruction to perform the method for transmitting a wake-up signal according to the first aspect or the second aspect of the present application.

In a sixth aspect, the present application provides a computer readable storage medium, the storage medium storing a computer program, and the computer program, when executed by the processor, implementing the method for transmitting a wake-up signal according to the first aspect or the second aspect of the present application.

The technical solutions provided by embodiments of the present application have the following beneficial effects: the method, the user equipment, the base station, and the readable storage medium for transmitting the wake-up signal provided by the embodiment of the present application, make that each UE group correspond respective WUS, by grouping the WUSs based on the UE, and the UE may determine the WUS corresponding to the UE group to which the UE belongs by receiving the configuration information of the UE group WUS, thereby monitoring the WUS corresponding to the UE group to which the UE belongs. The solutions of the embodiments of the present application, further reduce the power consumption of the UE on the basis of the existing Rel-15 WUS.

BRIEF DESCRIPTION OF THE DRAWINGS

In order to more clearly illustrate the technical solutions in the embodiments of the present application, the drawings used in the description of the embodiments of the present application will be briefly described below.

FIG. 10 illustrates a schematic diagram of FDM and TDM being adopted at the same time between a Rel-16 group WUS and a Rel-15 WUS in same timeOffset in an example of the present application;

FIG. 11 illustrates a schematic diagram of TDM being adopted between a Rel-16 group WUS and a Rel-15 WUS in same timeOffset in an example of the present application;

DETAILED DESCRIPTION

Figure 1:
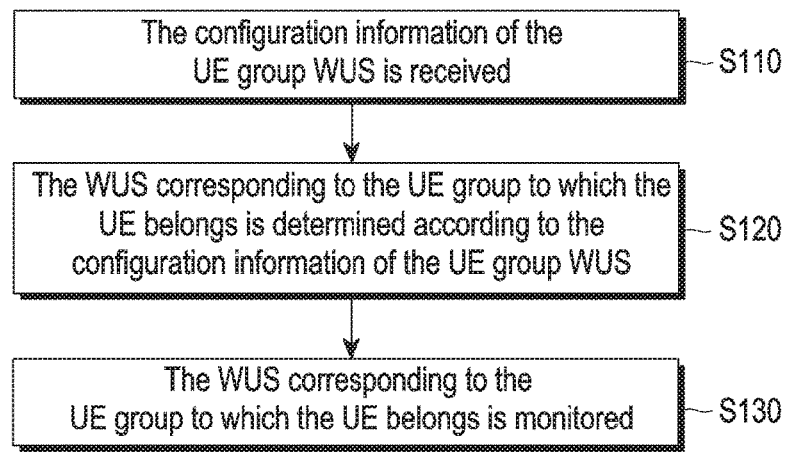
FIG. 1 illustrates a schematic flowchart of a method for transmitting a wake-up signal according to an embodiment of the present application.

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/including" used in this specification of the present application specify the presence of the stated features, integers, steps, operations, elements and/or components, but not exclusive of the presence or addition of one or more other features, integers, steps, operations, elements, components, and/or combinations thereof. It should be understood that when an element is referred to as being "connected to" or "coupled to" another element, it may be directly connected or coupled to other elements or provided with intervening elements therebetween. In addition, "connected to" or "coupled to" as used herein may include wireless connection or wireless coupling. As used herein, the term "and/or" includes all or any of one or more associated listed items or combinations thereof.

Those skilled in the art will appreciate that all terms (including technical terms and scientific terms) used herein have the same meaning as commonly understood by one of ordinary skill in the art to which the present application belongs, unless otherwise defined. It should also be understood that those terms, such as those defined in a general dictionary, should be understood as having a meaning consistent with the meaning in the context of the prior art, and it is not intended to be construed in an idealized or overly formal sense unless specifically defined herein.

Those skilled in the art may understand that the "terminal" and "terminal equipment" as used herein include both a wireless signal receiver device only having a wireless signal receiver without a transmitting capability, and a receiving and transmitting hardware device having a device capable of receiving and transmitting hardware for two-way communication over a two-way communication link. Devices as such may include: a cellular or other communication devices having a single line display or a multi-line display, or a cellular or other communication device without a multi-line display; a PCS (Personal Communications Service), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System) receiver; a conventional laptop and/or a palmtop computer or other devices, which having and/or including a conventional laptop and/or palmtop computer or other devices having and/or including a radio frequency receiver. As used herein, "terminal" and "terminal equipment" may be portable, transportable, installed in a vehicle (in aviation, sea and/or land), or adapted and/or configured to operate locally, and/or operated in any other location on the earth and/or space in a distributed form. As used herein, "terminal" and "terminal equipment" may also be a communication terminal, an internet terminal, and a music/video playing terminal, for example, a PDA, a MID (Mobile Internet Device), and/or a mobile phone having a music/video playback function, and may also be a smart TV, a set-top box and other devices.

The technical solutions of the present application and how the foregoing technical problem is resolved by the technical solutions of the present application are described below in detail by using specific embodiments. The following several specific embodiments may be combined with each other, and details of same or similar concepts or processes may not be described in some embodiments. With reference to the accompanying drawings, the embodiments of the present application will be described below.

In the existing Rel-15 LTE system, the introduction of WUS is to reduce the power consumption of the UE for monitoring the physical control channel of the PO. Due to that the power consumption for monitoring WUS is very low, the power consumption for monitoring WUS is significantly lower than the power consumption for monitoring the physical control channel. If there is no PO actually transmitted in one paging cycle, the power consumption of the UE having a WUS capability may be significantly reduced. If there is a PO actually transmitted in one paging cycle, the power consumption of the UE having a WUS capability will additionally increase the power consumption for monitoring WUS. But in the actual network, the probability of actually transmitting PO in one paging cycle is much lower than the probability of not actually transmitting PO, the overall power consumption of the UE having a WUS capability in the RRC idle mode may be significantly reduced.

For the paging message from the RAN side, all UEs in RRC idle mode in the cell need to receive it, but for the paging message from the CN side, only the paged UE needs to receive it, and other UEs do not need to receive it. If the paging channel only includes a paging message from the CN side, then this paging channel is meaningless to other UEs except for the paged UE, thus causing the waste of the power consumption for these other UEs monitoring and receiving the paging channel.

The embodiments of the present application provide a method, a user equipment, a base station, and a readable storage medium for transmitting a wake-up signal, for the above problems existed in the prior art.

In the embodiments of the present application, for the convenience of the description, a UE having a capability of monitoring the WUS in the existing Rel-15 LTE system is referred to as a UE having the capability of supporting the Rel-15 WUS, and may be further referred to as a Rel-15 UE; a UE supporting the method for transmitting the WUS in the embodiments of the present application is referred to as a UE having the capability of supporting the Rel-16 WUS, which may be further referred to as a Rel-16 UE. It may be understood that for a UE in the network, one UE may have the capabilities of supporting Rel-15 WUS and supporting Rel-16 WUS simultaneously, or may have the capability of supporting Rel-15 WUS or supporting Rel-16 WUS, or may have neither the capability of supporting Rel-15 WUS or supporting Rel-16 WUS. For a UE having the capability of supporting the Rel-15 WUS and supporting the Rel-16 WUS simultaneously, it may be referred to as a UE supporting the Rel-16 WUS capability, which may be further referred to as a Rel-16 UE.

FIG. 1 illustrates a schematic flowchart of a method for transmitting a wake-up signal according to an embodiment of the present application. The method is performed by a UE. As shown in FIG. 1, the method may include the followings:

Step S110: configuration information of the UE group WUS is received.

Step S120: the WUS corresponding to the UE group to which the UE belongs is determined according to the configuration information of the UE group WUS.

Step S130: the WUS corresponding to the UE group to which the UE belongs is monitored.

Wherein, the configuration information of the UE group WUS is used to indicate the information of the UE group WUS.

The method for transmitting the wake-up signal of the present application implements a WUS based on the UE group, wherein the WUS based on the UE group refers to determining of one of a plurality of WUSs based on the UE group, and different UE groups correspond to respective WUSs. For a UE, the WUS corresponding to the UE is the WUS corresponding to the UE group to which the UE belongs. Wherein, the configuration information of the UE group WUS is the configuration information of the UE for determining the WUS corresponding to the UE group to which the UE belongs.

In the method for transmitting the wake-up signal in the embodiment of the present application, one UE group corresponds to the respective WUS by grouping the UEs, the PO in one paging cycle corresponds to multiple WUSs, and each of the WUSs corresponds one group of all UEs that monitor the PO; each of the WUSs indicates whether the UEs in the corresponding UE group need to monitor the PO; the UE receives the configuration information of the UE group WUS transmitted by the base station, and determines the WUS corresponding to the UE group to which the UE belongs based on the configuration information of the UE group, thereby monitoring the WUS corresponding to the UE group to which the UE belongs, without monitoring WUSs corresponding to other UE groups. The method for transmitting the WUS in the embodiments of the present application, further reduces the power consumption of the UE on the basis of the existing Rel-15 WUS.

In the embodiments of the present application, for the convenience of description, the "WUS based on UE group" is simply referred to as "group WUS", "UE group WUS" and "WUS group", and "perform UE grouping on WUS" is simply referred to as "grouping WUS" and "grouping UE".

When the UE supports the group WUS and the network also provides the configuration information of the group WUS, the UE should monitor the corresponding group WUS according to the group WUS parameter provided in the system information. When DRX is used and the UE detects the corresponding group WUS, the UE should monitor the corresponding PO. When eDRX is used and the UE detects the corresponding group WUS, the UE should monitor corresponding multiple POs (numPOs), until the paging message is received. If the UE does not detect the corresponding WUS, the UE does not need to monitor the corresponding PO or multiple POs (numPOs). Herein, numPOs is a configuration parameter provided by the system information, and refers to the number of consecutive POs corresponding to one group WUS.

With the method for transmitting the wake-up signal in the embodiments of the present application, if the UE paged by the PO belongs to only one of the UE groups, other UE groups except for the UE group to which the paged UE belongs do not need to monitor the PO, and the base station may only transmit the WUS corresponding to the UE group to which the paged UE belongs, without transmitting the WUSs corresponding to other UE groups, which may avoid the UEs of these UE groups wasting unnecessary power consumption to monitor and receive the PO, thereby reducing the power consumption of the UEs for monitoring and decoding meaningless PO thereto.

The WUS based on the UE group is for further reducing the power consumption of the UE. If the number of WUS groups is larger, the probability that the UE monitors and decodes the PO that is meaningless to itself is more effectively reduced, but the excessive number of WUS groups may consume more system resources. Optionally, the maximum number of WUS groups may be approximately 3 to 6, which may compromise the system resource overhead of the WUS and reduction of the power consumption of the UE.

The manner for multiplexing signal between multiple group WUSs includes frequency division multiplexing (FDM), time division multiplexing (TDM), or code division multiplexing (CDM). In practical applications, the FDM, TDM, or CDM may be used between multiple group WUS s. Wherein, the TDM may cause the WUS corresponding to some UE groups to be placed farther before the PO, and after monitoring the WUS, if these UE groups need to further monitor the paging channel, the power consumption of the UE may be increased due to an extra time introduced by the TDM; the CDM may reduce the effective transmission power of each WUS, and the actual transmission time of the WUS needs to be extended to achieve the same coverage as the TDM or FDM, where the extended WUS transmission time will increase the power consumption of the UE; the FDM is best in terms of the power consumption of the UE compared with the TDM or CDM, but it is limited by bandwidth limitations. In practical applications, different multiplexing manners may be selected according to actual application requirements.

In practical applications, for the MTC UE, the FDM is recommended to be used between multiple group MWUSs. If one MWUS is considered to occupy one physical resource block (PRB), then one narrow band (including 6 PRBs) may multiplex 6 MWUSs at most, that is, the available maximum number of the MWUS groups may approximate to 6; if one MWUS is considered to occupy 2 PRBs, then one narrow band may multiplex 3 MWUS s at most, that is, the available maximum number of the MWUS groups may approximate to 3.

For the NB-IOT UE, since one carrier (including one PRB) may transmit 1 WUS at most in the frequency domain, the TDM is recommended between multiple group WUSs, and the available maximum number of WUS groups approximates to 4.

In practical applications, in order to provide sufficient flexibility for the base station (eNB) achieving different degrees of compromise between the system resource overhead of the group WUS and reduction of the UE power consumption, the system may only prescribe the maximum number of the groups WUSs, and the actual number of the group WUSs may be indicated in the configuration information of the UE group WUS, such as the system information of the cell broadcast.

It may be understood that, in the embodiment of the present application, the UE, which is capable of receiving the configuration information of the UE group WUS, is the UE in the RRC idle mode and having the capability of supporting Rel-16 WUS.

In an optional solution of the present application, the UE may report to the network whether it has the capability(-ies) of supporting the Rel-16 group WUS and/or the Rel-15 WUS. When the network pages the UE, if the UE supports the Rel-16 group WUS, the base station will transmit the WUS corresponding to the UE group to which the UE belongs, to wake up the UE; if the UE does not support the Rel-16 group WUS and only supports the Rel-15 WUS, the base station will transmit the Rel-15 WUS, to wake up the UE; if the UE neither support the Rel-16 group WUS nor support Rel-15 WUS, the base station will not transmit any WUS.

The capability of the UE supporting the WUS should also be reported to CN. That is, CN will save the information on the corresponding capability of supporting WUS for each UE that resides in the network. When CN is paging the UE, the information on the capability corresponding to the UE will also be informed to RAN. The advantage of this optional manner is that the base station may transmit the WUS based on the capability of the UE, rather than blindly transmitting the WUS to wake up other unpaged UEs that have the WUS capability, which is due to that the Rel-15 WUS wakes up all UEs corresponding to the PO, but Rel-16 WUS wakes up one group of the UEs corresponding to the PO.

In an optional implementation of the present application, the receiving the configuration information of the UE group WUS includes:

receiving the broadcasted cell system information, wherein the cell system information includes the configuration information of the UE group WUS.

In practical applications, the configuration information of the UE group WUS may be indicated in the system information (SI) broadcasted by the cell. In an optional solution, the base station may indicate the configuration information of the UE group WUS in a system information block (SIB).

In an optional implementation of the present application, the configuration information of the UE group WUS may include the number of the UE group WUSs, and at this time, the determining the WUS corresponding to the UE group to which the UE belongs according to the configuration information of the UE group WUS includes:

determining the WUS corresponding to the UE group to which the UE belongs according to the number of the UE group WUSs.

The number of the UE group WUSs, that is, the actual number of the UE group WUSs configured by the system, that also is the number of group WUSs (numUE- GroupBasedWUS). In this optional manner, the UE may determine the WUS corresponding to the UE group to which the UE belongs according to the WUS grouping manner prescribed by the system and the number of UE group WUSs in the configuration information.

In an optional solution, the number of the UE group WUSs may be configured explicitly by a dedicated parameter (such as the configuration parameter numUE-GroupBasedWUS) within the configuration information of the UE group WUS. In another optional solution, the number of the UE group WUSs may be configured implicitly by a parameter within the configuration information of the UE group WUS. For example, the system configures a time offset parameter for each UE group WUS, then the number of the configured time offsets implies the number of the UE group WUSs. It may be understood that the implicitly configured parameter for indicating the number of the UE group WUSs may also be another parameter by configured by the system.

In an optional implementation of the present application, the number of the UE group WUSs may include at least one of the following:

the number of the group WUSs corresponding to a discontinuous reception mode;

the number of the group WUSs corresponding to a time offset type, wherein the time offset is the time interval between the WUS and the corresponding PO.

In an optional implementation of the present application, if the number of the UE group WUSs includes the number of the group WUSs corresponding to the time offset type, the determining the WUS corresponding to the UE group to which the UE belongs according to the number of the UE group WUSs includes:

determining the number of the group WUSs corresponding to the UE according to the time offset type corresponding to the UE;

determining the WUS corresponding to the UE group to which the UE belongs according to the number of the group WUSs corresponding to the UE.

Wherein, the discontinuous reception mode type refers to the type of the discontinuous reception mode of the UE, and the discontinuous reception mode type of the UE includes discontinuous reception (DRX) or extended discontinuous reception (eDRX). For convenience of description, a UE using DRX is referred to as a DRX UE, and a UE using eDRX is referred to as an eDRX UE. In an optional solution of the present application, the numbers of the UE groups prescribed by the system for the DRX UE and the eDRX UE may be different, that is, the number of the UE groups is related to whether the UE uses the DRX cycle or the eDRX cycle to monitor the paging channel. For example, the maximum number of the WUS groups for the DRX UE may be 4, and the maximum number of the WUS groups for the eDRX UE may be 2. The advantage of this optional solution is that the fewer number of the WUS groups being used for the eDRX UE may be consistent with the actual network condition, which is due to the number of eDRX UEs in the cell is generally much smaller than the number of DRX UEs.

In practical applications, the network may respectively configure the number of group WUSs for the DRX UE and the eDRX UE. For example, in the configuration information of the UE group WUS, the numUEGroupBasedWUS-DRX may be used to indicate the number of the group WUSs for the DRX UEs, and the numUEGroupBasedWUS-eDRX is used to indicate the number of group WUSs for the eDRX UEs. Based on the solution, the base station may respectively configure different number of groups for the DRX UE or the eDRX UE according to the network condition.

The timeOffset type refers to the type of time offset between the WUS and the corresponding PO. In the existing Rel-15 LTE system, there are three types of timeOffsets, namely timeOffsetDRX (the time offset corresponding to the DRX UE), timeOffset-eDRX-short (the short time offset corresponding to the eDRX UE), and timeOffset-eDRX-long (the long time offset corresponding to the eDRX UE), wherein the first type timeOffset is used for the DRX UE and the latter two are used for the eDRX UE.

In an optional solution of the present application, the number of group WUSs may be related to the timeOffset adopted by the UE, that is, related to the type of time offset between the WUS corresponding to the UE and the corresponding PO. For example, the numUEGroupBasedWUS-DRX may be used to indicate the number of group WUSs based on the timeOffsetDRX, the numUEGroupBasedWUS-eDRX-short may be used to indicate the number of group WUSs based on the timeOffset-eDRX-short, and the numUEGroupBasedWUS-eDRX-long may be used to indicate the number of group WUSs based on the timeOffset-eDRX-long. The advantage of this optional solution is that the system may further group WUSs, which have been grouped based on the UE, based on the timeOffset of the Rel-15 WUS, and may respectively configure different numbers of WUS groups for different types of timeOffset to provide sufficient flexibility according to network conditions.

In practical applications, when the configuration information of the UE group WUS includes the number of groups corresponding to each discontinuous reception mode type, and when receiving the configuration information, the UE may first determine the number of corresponding group WUSs based on the discontinuous reception mode of the UE, and then determine the WUS corresponding to the UE group to which the UE belongs, based on the number of groups corresponding to the mode and the WUS grouping mode prescribed by the system and according to the number of group WUSs corresponding to the mode. Similarly, when the configuration information of the UE group WUS includes the number of group WUSs corresponding to each time offset type, the UE may first determine the number of group WUSs corresponding to the time offset type corresponding thereto according to the time offset type corresponding thereto, and then determine the WUS corresponding to the UE group to which it belongs based on the determined number of group WUSs and the WUS grouping mode prescribed by the system.

In actual applications, it is also possible to configure to perform WUS grouping on which UEs according to actual application requirements. For example, the Rel-16 group WUS may be used for all Rel-16 UEs, or only for some Rel-16 UEs, that is, WUS grouping may be performed on all Rel-16 UEs or only some Rel-16 WUSs. For another example, the system may configure the Rel-16 group WUS only for the DRX UE, and not configure the Rel-16 group WUS for the eDRX UE. For another example, the system may perform WUS grouping only on the eDRX UEs that monitor the WUS based on the timeOffset-eDRX-Short, and not perform WUS grouping on the eDRX UEs that monitor the WUS based on the timeOffset-eDRX-long.

In an optional implementation of the present application, the configuration information of the UE group WUS may include the time domain location indicating information of the WUS corresponding to the at least one UE group, or the time domain location indicating information and the frequency domain location indicating information corresponding to the at least one UE group.

Wherein, the time domain location indicating information of the WUS corresponding to the at least one UE group is the information indicating the time domain location of the WUS corresponding to the at least one UE group, and the time domain location indicating information and the frequency domain location indicating information corresponding to the at least one UE group is the information indicating the time domain location and the frequency domain location of the WUS corresponding to the at least one UE group.

In practical applications, each UE may obtain the time domain location, or the time domain location and the frequency domain location, of the WUS corresponding to the UE group to which each UE belongs, based on the time domain location indicating information of the WUS corresponding to the at least one UE group in the configuration information of the UE group WUS, or the time domain location indicating information or the frequency domain location indicating information of the WUS corresponding to the at least one UE group, as well as the positional relationship of the time domain locations between the WUSs corresponding to each UE group prescribed by the system, or the positional relationship of the time domain locations and the positional relationship of the frequency domain locations between the WUSs corresponding to each UE group, thereby monitoring the WUS corresponding to the UE group to which the UE belongs based on the time domain location, or the time domain location and the frequency domain location, of the WUS corresponding to the UE group to which the UE belongs.

It may be understood that, for the NB-IOT, the frequency domain location of each UE group is identical. Therefore, the configuration information of the UE group WUS may only include the time domain location indicating information of the WUS corresponding to the at least one UE group.

In an optional implementation of the present application, the configuration information of the UE group WUS further includes indicating information of a WUS grouping manner, and the determining the WUS corresponding to the UE group to which the UE belongs according to the number of the UE group WUSs includes:

determining the WUS corresponding to the UE group to which the UE belongs according to the indicating information of the WUS grouping manner and the number of the UE group WUSs.

Wherein, the indicating information of the UE grouping manner is information for indicating a specific grouping manner of each group WUS.

In the optional solution of the present application, the value of the number of the WUS groups may be in the range of 2 to maxNumUEGroupBasedWUS, and the maxNumUEGroupBasedWUS is the maximum number of the WUS groups prescribed by the system. As described above, the range of maxNumUEGroupBasedWUS may be 3 to 6, so that there is a good compromise between WUS signaling overhead and the reduction of probability of unnecessary UE wakeup. For example, for the MTC UE, maxNumUEGroupBasedWUS nay be 3, 4, 5, and 6; for the NB-IOT, maxNumUEGroupBasedWUS may be 4.

In an optional implementation of the present application, the WUS grouping manner may include at least one of the following:
grouping based on a UE ID;
grouping based on a UE network coverage level;
grouping based on a UE group configuration parameter;
grouping based on a discontinuous reception mode;
grouping based on the time offset type.

In practical applications, the ID of the UE may be the IMSI or S-TMSI of the UE.

Wherein, the group configuration parameter is a parameter that is configured by the system (such as the CN) for each UE to determine the WUS corresponding to the UE group to which the UE belongs, and the parameter may be configured by the system according to actual application requirements, for example, the service type or other parameters of the UE, wherein different service types may correspond to different paging delay requirements, and may also correspond to different paging cycles. For example, in the existing system, the value of the UE-specific-Paging Cycle configured by the network for the UE (the paging cycle configured by the CN to the UE) is an embodiment of the service types.

The WUS group may have multiple grouping methods, that is, grouping based on at least one of the above WUS grouping methods, such as grouping by UE ID, grouping by UE Coverage Level, or grouping by group configuration parameter (such as service type). When using different WUS grouping methods, the rules of the UE determining the WUS corresponding to the UE group to which the UE belongs are different.

In practical application, the system may support multiple WUS grouping manners, and configure to use which WUS grouping manner in the configuration information (such as the SIB) of the UE group WUS. When receiving the configuration information of the group WUS, the UE may determine the WUS corresponding to the UE group to which the UE belongs by the corresponding rule, according to the specific WUS grouping manner (Grouping-Metric) configured in the configuration information.

In practical applications, the rule for selecting the WUS grouping manner is to uniformly group all UEs in the RRC idle mode corresponding to the same PO in the cell, thereby maximumly reducing the probability of a UE being awake up unreasonably, so as to minimize the power consumption of the UE.

In an optional implementation of the present application, if the WUS grouping manner is grouping based on the UE ID, the determining the WUS corresponding to the UE group to which the UE belongs according to the indicating information of the grouping manner and the number of the UE group WUSs, includes:

when the indicating information of the WUS grouping manner indicates that the WUS is grouped based on the ID of the UE, determining the WUS corresponding to the UE group to which the UE belongs according to the ID of the UE and the number of the UE group WUS s.

In an optional solution, for a plurality of group WUSs, an identity (ID) of each WUS may be respectively configured, and an ID of each WUS corresponds to one WUS. In this solution, when determining the WUS corresponding to the UE group to which the UE belongs, it may be determined that the ID of the WUS corresponding to the UE group to which the UE belongs. As may be seen from the foregoing description, one WUS corresponds to one UE group. Therefore, in an optional solution, the ID of the WUS may also be referred to as the ID of the UE group to which the UE belongs. Wherein, the ID of the WUS may be understood as the serial number of multiple group WUSs corresponding to one PO, or other identifying manner.

In an optional solution, when the configuration information (such as cell system information) of the UE group WUS indicates that the UEs are grouped by the UE ID, or the system prescribes that the UE group WUS is grouped based on the UE ID, the WUS corresponding to the UE group to which the UE belongs may be determined by the following formula:

$$UEGroup\_ID = UE\_ID \% numUEGroupBasedWUS$$

Wherein, the UEGroup_ID indicates the ID of the WUS corresponding to the UE group to which the UE belongs; the UE_ID is the ID of the UE; the numUEGroupBasedWUS is the number of the group WUSs configured in the configuration information (such as the cell system information) of the UE group WUS, that is, the number of UE groups; and % indicates the modulo operation. In an optional manner, for the MTC UE, UE_ID=IMSI % 16384, wherein the IMSI is the International Mobile Subscriber Identity of the UE. For the NB-IOT UE, if the UE supports to page the paging channel on the non-anchor carrier, and the cell system information has configured paging channel on the non-anchor carrier, UE_ID=IMSI % 16384, otherwise UE_ID=IMSI % 4096. In this optional solution, the ID of the WUS corresponding to the UE group to which the UE belongs is determined by the above formula. Since one ID uniquely corresponds to one WUS, determining of the ID of the WUS namely determines the WUS corresponding to the UE group to which the UE belongs.

In an optional implementation of the present application, if the WUS grouping manner is the grouping based on the UE network Coverage Level, the determining the WUS corresponding to the UE group to which the UE belongs according to the indicating information of the grouping manner and the number of the UE group WUSs, includes:

determining the WUS corresponding to the UE group to which the UE belongs according to the UE network Coverage Level of the UE and the number of the UE group WUSs, when the indicating information of the WUS grouping manner indicates that the WUSs are grouped based on the network Coverage Level of the UE.

In an optional solution, when the cell system information indicates that the WUSs are grouped through the Coverage Level, or the system prescribes that the WUSs are grouped based on the UE network Coverage Level, the WUS corresponding to the UE group to which the UE belongs may be determined by the following formula:

$$UEGroup\_ID = Coverage\_Level \% numUEGroupBasedWUS$$

Wherein, the UEGroup_ID indicates the ID of the WUS corresponding to the UE group to which the UE belongs; the Coverage_Level indicates the network Coverage Level of the UE; the numUEGroupBasedWUS is the number of the group WUSs, that is, the number of the US groups; and % indicates the modulo operation.

In actual applications, the Coverage_Level of the UE may be configured by the network according to actual application requirements, for example, it may be configured by the CN. In an optional solution, the Coverage_Level may be in the range of 0 to 3, which may be divided into four levels: Coverage_Level 0 (abbreviated as CE Level 0), CE Level 1, CE Level 2, and CE Level 3. The Coverage_Level may be determined by the Reference Signal Receiving Power (RSRP), and may be the same as the Coverage Level selecting mechanism of the Physical Random Access Channel (PRACH).

Herein, the Coverage Level of the UE should be reported to the CN, and the CN will save the reported information of the corresponding Coverage Level for each UE that resides in the network. When the CN is paging the UE, the Coverage Level information corresponding to the UE will also be informed to the RAN. When the Coverage Level of the UE changes, it should be reported to the CN in time to enable the CN to update the Coverage Level of the UE in time.

Optionally, if the Coverage Level of the UE increases, the UE is required to report the new Coverage Level in time; if the Coverage Level of the UE decreases, the UE is possible not to report the new Coverage Level in time, and determines the corresponding WUS based on the old Coverage Level. It is implemented by the UE whether to report a new Coverage Level.

Optionally, the base station transmits the Coverage Level reported by the UE to the corresponding WUS. If the paged UE does not respond in time, the base station may also try to transmit the WUS corresponding to the other Coverage Levels.

Optionally, when the WUS is grouped by the Coverage Level, the maximum number of group WUSs may be the same as the maximum number of Coverage Levels. For example, when the Coverage Level is divided into four levels, the maximum number of WUSs is up to 4.

In practical applications, the actual number of the group WUSs, that is, the number of UE groups, may be consistent with the number of Coverage Levels of the PRACH configured by the cell, and now no additional signaling configuration is needed. The actual number of the group WUSs may also be unequal to (e.g., less than) the number of Coverage Levels of the PRACH configured by the cell. In this case, a dedicated signaling indication is required.

In an optional implementation of the present application, if the WUS grouping manner is the grouping based on the group configuration parameter of the UE, for example, taken the service type as an example, the determining the WUS corresponding the UE group to which the UE belongs at this time according to the indicating information of the grouping manner and the number of the UE group WUSs, includes:

determining the WUS corresponding to the UE group to which the UE belongs based on the Service ID of the UE and the number of the UE group WUSs, when the indicating information of the WUS grouping manner indicates that the WUSs are grouped based on the Service_ID of the UE.

Wherein, the Service_ID is the identity of the service type configured by the system for each UE.

In an optional solution, when the cell system information indicates that the WUSs are grouped based on the service type, or the system prescribes that the UE group WUSs are grouped based on the service type, the WUS corresponding to the UE group to which the UE belongs may be determined by the following formula:

$$UEGroup\_ID = Service\_ID \% numUEGroupBasedWUS$$

Wherein, the UEGroup_ID indicates the ID of the WUS corresponding to the UE group to which the UE belongs. The Service ID is the service type ID of the UE, which is a UE-specific value configured by the network and may be configured by the core network. The CN will save the configuration information of the corresponding Service_ID of each UE that resides in the network. When paging the UE, the CN will also inform the RAN of the Service ID information corresponding to the UE.

Optionally, the Service_ID may be implicitly calculated by the indicating information (such as UE-specific-Paging-Cycle) of the group configuration parameter configured by the network. For example, the value range of the UE-specific-PagingCycle is assumed to be {320, 640, 1280, 2560} ms, if UE-specific-PagingCycle in the system is configured to be 320 ms, Service_ID=0; if UE-specific- PagingCycle is configured to be 640 ms, Service_ID=1; if UE-specific-PagingCycle is configured to be 1280 ms, Service ID=2; if UE-specific-PagingCycle is configured to be 2560 ms, Service_ID=3.

In an optional implementation of the present application, the group configuration parameter of the UE may also be a configuration ID (UEGroup_ID') of the WUS corresponding to the UE group to which the UE configured by the system belongs, and the configuration ID is also a UE-specific value configured by the network (namely, the core network), that is, the CN will save the configuration information of the corresponding UEGroup_ID' for each UE that resides in the network. When paging the UE, the CN also informs the RAN of the UEGroup_ID' information corresponding to the UE.

In an optional solution, the UE determines the WUS corresponding to the UE group to which the UE belongs, according to the configured UEGroup_ID' and the number of the UE groups configured by the cell system information, that is, the number of the group WUSs (numUE-GroupBasedWUS), which may be determined by the following formula:

UEGroup_ID=UEGroup_ID'% numUE-GroupBasedWUS

In this formula, UEGroup_ID indicates the ID of the WUS corresponding to the UE group to which the UE belongs, and % indicates the modulo operation. The value of the configuration ID (that is UEGroup_ID') of the WUS corresponding to the UE to which the UE belongs may range from 0 to maxNumUEGroupBasedWUS-1, wherein maxNumUEGroupBasedWUS is the maximum selectable number of the group WUSs. When the number of the actual group WUSs configured by the cell is maxNumUEGroupBasedWUS, the configured UEGroup_ID' is the ID of the WUS corresponding to the UE group to which the UE belongs. When the actual number of group WUSs configured by the cell is less than maxNumUEGroupBasedWUS, the configured UEGroup_ID' can obtain the ID of the WUS corresponding to the UE group to which the UE belongs, by modulo calculation on maxNumUEGroupBasedWUS.

In an optional solution, the UEGroup_ID' may also be represented as other parameters. For example, the UEGroup_ID' is replaced by the Service ID described in the foregoing, and the Service_ID is related to the service type, and the constant is a UE-specific value configured by the network, which is specific for calculating the ID of the WUS corresponding to the UE group to which the UE belongs.

In an optional solution, the base station may further indicate, in the cell system information, whether the UE-specific UEGroup_ID' may be used to determine the WUS corresponding to the UE group to which the UE belongs; if yes, the WUS corresponding to the UE group to which the UE belongs is determined according to the foregoing second manner; if not, the WUS corresponding to the UE group is implicitly calculated according to the predefined method, that is, the WUS corresponding to the UE group to which the UE belongs is determined according to the foregoing first manner, for example, the WUS corresponding to the UE group to which the UE belongs is determined according to the UE ID.

In an optional implementation of the present application, if the grouping manner is the grouping based on the time offset type, the number of the UE group WUSs may include the number of group WUSs corresponding to each time offset type, and the determining the WUS corresponding to the UE group to which the UE belongs according to the indicating information of the grouping manner and the number of the UE group WUSs, includes:

determining the WUS corresponding to the UE group to which the UE belongs according to the time offset type corresponding to the UE and the number of the group WUSs corresponding to the time offset type corresponding to the UE.

It may be seen from the foregoing description that the determination of timeOffset is related to whether the UE is configured as the DRX or the eDRX. For the eDRX UE, the determination of timeOffset is also related to the minimum interval capability (wakeUpSignalMinGap-eDRX) between the WUS monitored under eDRX by the UE and the corresponding PO, wherein the minimum interval is mainly used for detecting the warm-up time for time-frequency synchronization after detecting the WUS. The different product implementations of the UE may have different capabilities, and the value range thereof may be {40 ms, 240 ms, 1000 ms, 2000 ms}.

If the UE is configured as the DRX, the timeOffset corresponding to the WUS is the timeOffsetDRX configured in the configuration information (cell system information) of the group WUS. If the UE is configured as the eDRX, the timeOffset corresponding to the WUS is related to the wakeUpSignalMinGap-eDRX capability reported by the UE, and the timeOffset-eDRX configured by the cell system information, wherein the timeOffset-eDRX includes timeOffset-eDRX-Short and timeOffset-eDRX-Long (optional configuration). If the reported wakeUpSignalMinGap-eDRX is equal to the timeOffset-eDRX-Short or timeOffset-eDRX-Long, the timeOffset corresponding to the WUS is the reported wakeUpSignalMinGap-eDRX; if the reported wakeUpSignalMinGap-eDRX is greater than timeOffset-eDRX-Long, the timeOffset corresponding to the WUS is timeOffset-eDRX-Short; if the reported wakeUpSignalMinGap-eDRX is less than the timeOffset-eDRX-Short or less than the timeOffset-eDRX-Long, the timeOffset corresponding to the WUS is the timeOffset-eDRX-Long.

In an optional manner, the DRX UE and the eDRX UE may be first grouped based on different timeOffsets, and then two type timeOffsets of the timeOffset-eDRX-Short and timeOffset-eDRX-Long are configured for the eDRX UE to adapt to different UE capabilities, and the eDRX UE is further grouped. When the timeOffset-eDRX-Short is configured to be greater than the timeOffsetDRX, there are actually three WUSs corresponding to the same PO, and the three WUSs correspond to different timeOffsets, namely timeOffsetDRX, timeOffset-eDRX-Short, and timeOffset-eDRX-Long.

When the configuration information (such as the cell system information) of the UE group WUS indicates that the WUSs are grouped based on the time offset type and the UE receives the configuration information of the UE group WUS, the UE first determines the time offset type corresponding to the UE, so that the WUS corresponding to the UE group to which the UE belongs is determined according to the number of the UE group WUSs corresponding to the time offset type corresponding to the UE.

In an optional implementation of the present application, if the UE grouping manner is a first grouping manner and a second grouping manner, wherein the first grouping manner is the grouping based on the time offset type and the second grouping manner is any one of the grouping based the UE ID, the grouping based on the UE network Coverage Level, and the grouping based on the UE group configuration parameter, in this case, the number of the UE group WUSs may further include the number of group WUSs corresponding to each time offset type, and the determining the WUS corresponding to the UE group to which the UE belongs according to the indicating information of the grouping manner and the number of the UE group WUSs, includes:

determining, according to the first grouping manner, the number of group WUSs corresponding to the time offset type corresponding to the UE;

determining the WUS corresponding to the UE group to which the UE belongs according to the second grouping manner and the number of group WUSs corresponding to each time offset type corresponding to the UE.

In the optional solution of the present application, after grouping the WUSs based on the timeOffset type, the WUSs may be further grouped based on the ID of the UE, based on the Coverage Level, or based on the group configuration parameter (such as the Service type), that is, the WUS groups under each timeOffset may be further grouped.

As may be seen from the foregoing description, it may be respectively configured whether the WUS groups under each timeOffset are further grouped. For example, the base station may configure the WUS groups under certain timeOffset-eDRX-Long to be further grouped, while the WUS groups under other timeOffsets are not further grouped. In addition, the number of WUS groups under each timeOffset may also be respectively configured. For example, the base station may configure more WUS groups under timeOffset-eDRX-Long than WUS groups under other timeOffsets.

In an example, the number of groups further grouped from the WUS groups under different timeOffsets may be the same by default. For example, the network configures three different timeOffsets, and the number of the WUS groups (numUEGroupBasedWUS) under different timeOffsets may be configured to be 2, such that there are actually 6 WUS corresponding to the same PO.

In an example, the numbers of the WUS groups under different timeOffsets may be different, and respectively configured, that is, the numbers of the WUS groups under the three timeOffsets, that is, timeOffsetDRX, timeOffset-eDRX-Short, and the timeOffset-eDRX-Long, may correspond to the numUEGroupBasedWUS-DRX, the numUEGroupBasedWUS-eDRX-ShortTimeOffset, and the numUEGroupBasedWUS-eDRX-LongTimeOffset respectively. In practical applications, if the timeOffsetDRX and the timeOffset-eDRX-Short are configured with the same value, then the numUEGroupBasedWUS corresponding to the timeOffsetDRX and the timeOffset-eDRX-Short should also be configured with the same value.

In an optional implementation of the present application, the time domain location indicating information of the WUS corresponding to at least one UE group may include at least one of the following information:

Information 1: the time offset between the group WUS corresponding to the at least one UE group and the corresponding PO, and indicating information of the maximum duration of the WUS corresponding to the at least one UE group;

Information 2: the time offset between the group WUS corresponding to the at least one UE group and the corresponding PO, the indicating information of the maximum duration of the WUS, and the time interval between adjacent groups WUSs;

Information 3: the time offset between the WUS corresponding to each UE group and the corresponding PO, and the indicating information of the maximum duration of the WUS corresponding to at least one UE group;

Information 4: the time domain location indicating information of the WUS corresponding to the ungrouped UE.

In an optional implementation of the present application, the frequency domain location indicating information corresponding to at least one UE group may include at least one of the following information:

the starting frequency domain location of the WUS corresponding to each UE group;

the starting frequency domain location and the WUS bandwidth of the group WUS corresponding to at least one UE group;

the frequency domain location indicating information of the WUS corresponding to the ungrouped UE.

It should be noted that the WUS corresponding to the ungrouped UE is the WUS in the existing Rel-15 LTE system, which may be recorded as the Rel-15 WUS.

In the existing Rel-15 LTE system, the maximum duration of the WUS is expressed by the Factor of the maximum duration (Rmax) of the Type-1 Common Search Space (CSS), that is, the maximum duration maxDuration of the WUS is that:

maxDuration=Max(maxDurationFactor*Rmax,1);

Type-1 CSS is the CSS used to schedule POs. For the MTC UE, the value range of Rmax is {1, 2, 4, 8, 16, 32, 64, 128, 256} ms, and the value range of maxDurationFactor (i.e. the above Factor) is {¼, ⅛, ¹⁄₁₆, ¹⁄₃₂}, that is, the value range of the maximum duration of WUS is equivalent to {1, 2, 4, 8, 16, 32, 64} ms; for the NB-IOT UE, the value range of the Rmax is {1, 2, 4, 8, 16, 32, 64, 128, 256, 512, 1024, 2048} ms, and the value range of the maxDurationFactor is {½, ¼, ⅛, ¹⁄₁₆, ¹⁄₃₂, ¹⁄₆₄, ¹⁄₁₂₈}, that is, the maximum duration of WUS is equivalent to {1, 2, 4, 8, 16, 32, 64, 128, 512, 1024} ms.

In an optional solution of the present application, the maximum duration of the WUSs corresponding to the multiple WUS groups, that is, the maximum duration of a plurality of group WUSs (maxDurationFactor-GroupBasedWUS) may be identical, and may be configured by using the same maxDurationFactor. This solution is mainly applicable to the WUS grouping manner except of those based on the Coverage Level. In this solution, the time domain location indicating information may only include the indicating information of the maximum duration of the WUS corresponding to one UE group, and the indicating information of the maximum duration of the WUS of each UE group may be calculated according to the time domain location indicating information in the configuration information of the UE group WUS.

In an optional solution of the present application, the maximum duration of multiple group WUSs may be different. The solution is mainly applicable to the WUS grouping method based on the Coverage Level. The maximum duration of different group WUSs is closely related to the Coverage Level, and the higher the Coverage Level is, the longer the maximum duration is. In this solution, the time domain location indicating information includes indicating information of the maximum duration of the group WUS corresponding to at least one Coverage Level, and the maximum duration of the group WUS corresponding to the at least one Coverage Level can be calculated according to the indicating information. The maximum duration of the group WUS corresponding to another Coverage Level can be calculated according to the calculated maximum duration. For example, the maximum duration of the WUS corresponding to the maximum Coverage Level may be calculated by the maxDurationFactor indicated by the cell system information block. The maximum duration of the WUSs corresponding to other Coverage Levels may be calculated according to a ratio based on the maximum duration of the WUS corresponding to the maximum Coverage Level, where the ratio may be a value prescribed by the system standard, for example, ½, ¼ or ⅛, or configured in the cell system information block.

As an example, schemes prescribed by the system for calculating the ratio of the maximum duration of the group WUS is shown in Table 1.

TABLE 1

| The number of CE levels | CE Level 0 | CE Level 1 | CE Level 2 | CE Level 3 |
|---|---|---|---|---|
| 4 | ⅛ | ¼ | ½ | 1 |
| 3 | ¼ | ½ | 1 | / |
| 2 | ½ | 1 | / | / |

As shown in Table 1, for the scheme shown in the second row, if the network is configured with 4 CE Levels, it is assumed that the maxDurationFactor in the configuration information of the UE group WUS is used for the WUS corresponding to the CE Level 3, the maxDuration of the WUS corresponding to the CE Level 0 is ⅛ of the maxDuration of the WUS corresponding to the CE Level 3, and the maxDuration of the WUS of another CE Level follows the similar pattern. Similarly, for the scheme shown in the third row, if the network is configured with 3 CE Levels, it is assumed that the maxDurationFactor in the configuration information of the UE group WUS is used for the WUS corresponding to the CE Level 0, the maxDuration of the WUS corresponding to the CE Level 1 is two times than the maxDuration of the WUS corresponding to the CE Level 0, and the maxDuration of the WUS corresponding to the CE Level 2 is four times than the maxDuration of the WUS corresponding to the CE Level 0.

In an optional solution of the present application, the TDM may be adopted between multiple group WUSs, that is, the frequency domain locations of the group WUSs are completely identical, and the group WUSs are consecutive the time domain; the timeOffset corresponding to any group WUS may be configured in the configuration information of the UE group WUS, and the timeOffset corresponding to another group WUS may be calculated by the timeOffset corresponding to the any group WUS in the configuration information and the maximum duration of the WUS. For example, the timeOffset corresponding to the first group WUS is configured in the cell system information block, and the timeOffset corresponding to another group WUS may be calculated by the timeOffset corresponding to the first group WUS and the maximum duration of the WUS. The advantage of this solution is that the complete continuity between the grouped WUSs may save the signaling overhead of the WUS parameter configuration and simplify the time domain resource allocation of the WUS. The time domain location indicating information in the scheme may be the information shown in the above information 1.

As an example, it is assumed that the time offset between the WUS corresponding to the first UE group and the corresponding PO is configured in the cell system information, and the maximum duration of all the WUSs is identical, which is the maxDuration, and the time offset timeOffset_Group_n between the WUS corresponding to the nth UE group and the corresponding PO may be calculated according to the following formula:

$$\text{timeOffset\_Group\_}n = \text{timeOffset\_Group\_1} + n*\text{maxDuration}$$

Herein, the timeOffset_Group_1 is the time offset between the WUS corresponding to the first UE group and the corresponding PO, configured in the cell system information, and the maxDuration is the maximum duration of the group WUS, which may be calculated from the maxDurationFactor and Rmax configured in the cell system information.

In an optional solution of the present application, the TDM may be adopted between multiple group WUSs, but it is not consecutive in time, and there is a certain interval between two adjacent group WUSs, where this interval may be a fixed value prescribed by the system standard, for example, 1 ms, or configured in the cell system information. Considering that the UE has a large error in downlink synchronization when detecting the WUS (because the clock will drift when the UE in the idle mode is sleeping), the two adjacent WUSs may affect the detection performance of the WUS; if a minimum interval is reserved between two adjacent group WUSs, the impact of synchronization errors on WUS detection performance may be avoided. In this solution, the timeOffset corresponding to the WUS of the any group UE may be configured in the configuration information of the UE group WUS, and the timeOffset of the WUS corresponding to another UE group may be calculated by the timeOffset corresponding to the WUS of the any group UE, the maximum duration of the WUS, and the interval between the WUSs. The time domain location indicating information in the scheme may be the information shown in the above information 2.

In an optional solution of the present application, the TDM may be adopted between multiple group WUSs, and different WUSs respectively use different timeOffset configurations, that is, the time domain locations of multiple group WUSs have no correlation and may be respectively configured, but the time offset between the PO and its nearest group WUS should be at least greater than or equal to 40 ms. The advantage of this solution is that the base station may freely allocate the time domain resources of the WUS to improve the efficiency of resource utilization. In this solution, the time domain location indicating information needs to include the time offset between the WUS corresponding to each UE group and the corresponding PO, as well as the indicating information of the maximum duration of the WUS corresponding to at least one UE group. It may be understood that, in this solution, if the maximum duration of the WUS corresponding to each UE group is identical, the time domain location indicating information may only include the indicating information of the maximum duration of the WUS corresponding to one UE group. If the maximum duration of the WUS corresponding to each UE group differs, the time domain location indicating information needs to include the indicating information of the maximum duration of the WUS corresponding to each UE group.

Figure 2:
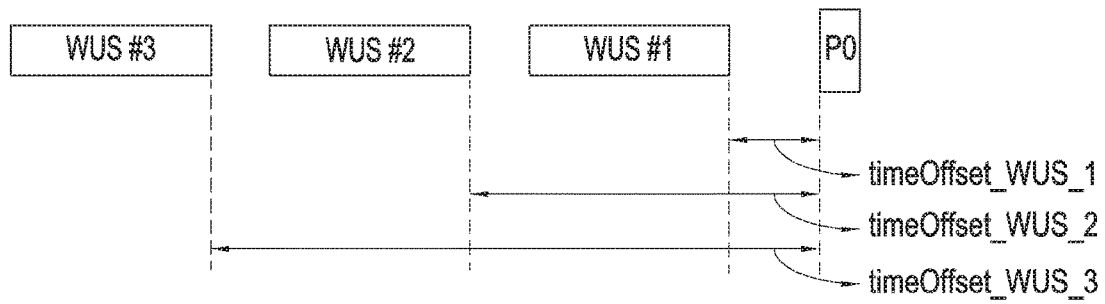
FIG. 2 illustrates a schematic diagram of group WUSs in which multiple group WUSs adopt Time Division Multiplexing (TDM) and different WUSs adopt different timeOffset configurations in an example of the present application.

As an example, a schematic diagram of group WUSs, in which multiple group WUSs adopt the TDM and different WUSs are configured with different timeOffsets, is shown in FIG. 2. As shown in FIG. 2, WUS #1, WUS #2, and WUS #3 are three groups of WUS, and the timeOffsets between WUS #1, WUS #2 and WUS #3, and the corresponding POs are timeOffset_WUS_1, timeOffset_WUS_1, and timeOffset_WUS_3 respectively. In an optional solution of the present application, the FDM or CDM may be adopted between multiple group WUSs, that is, the time domain locations of multiple group WUSs may be identical, and in this case, multiple group WUSs should use the same timeOffset configuration.

It should be noted that the parameter configuration manner of the time offset (GroupOffset-GroupBasedWUS) between the group WUS and the corresponding PO in each foregoing optional scheme may be used for both the DRX and the eDRX simultaneously, and the timeOffset-GroupBasedWUS may be in the range of {40 ms, 80 ms, 160 ms, 240 ms} or larger values, such as 320 ms, 480 ms, etc.

In an optional solution of the present application, the parameter configuration for the time offset between the group WUS and the corresponding PO may also be respectively configured based on the DRX UE or the eDRX UE.

As an example, for the DRX UE, the time offset (timeOffset-GroupBasedWUS-DRX) between the group WUS and the corresponding PO may be in the range of {40 ms, 80 ms, 160 ms, 240 ms} or larger values.

As an example, for the eDRX UE, the time offset between the group WUS and the corresponding PO may be further configured based on the short time offset timeOffset-eDRX-Short and the long time offset timeOffset-eDRX-Long.

For example, for the timeOffset-eDRX-Short, the short time offset (timeOffset-GroupBasedWUS-eDRX-Short) between the group WUS and the corresponding PO may be in the range of {40 ms, 80 ms, 160 ms, 240 ms} or larger values. When a group WUS corresponds to a plurality of consecutive POs, the short time offset of the configuration represents the short time offset between the group WUS and the corresponding first PO. When configured by the base station, the value of timeOffset-GroupBasedWUS-eDRX-Short should be greater than or equal to that of the timeOffset-GroupBasedWUS-DRX.

For another example, for the timeOffset-eDRX-Long, the long time offset (timeOffset-GroupBasedWUS-eDRX-Long) between the group WUS and the corresponding PO may be in the range of {1000 ms, 2000 ms} or larger values. When a group WUS corresponds to a plurality of consecutive POs, the long time offset represents the long time offset between the group WUS and the corresponding first PO.

It should be noted that the foregoing description of the parameter configuration manner for the time offset between the group WUS and the corresponding PO that may be used simultaneously for the DRX UE and the eDRX UE may be also applied to configure the time offset between the group WUS of the DRX UE and the corresponding PO, and configure the time offset between the group WUS of the eDRX UE and the corresponding PO. For example, different group WUSs may use the same timeOffset by default, that is the time domain locations are identical; or different group WUSs may use different timeOffsets, and there is a certain correlation between timeOffsets of different group WUSs, for example, multiple groups WUSs are completely consecutive or have at a certain interval therebetween, in which the time domain locations of the other group WUSs may be calculated by the timeOffset (configured in the cell system information) of one of the group WUSs; or, different group WUSs may use different timeOffsets, and there is no correlation between different group WUSs, which need to be configured respectively.

In an optional solution of the present application, for the MTC UE, the frequency domain location (freqLocation) of the WUS corresponding to each UE group may be the starting PRB location of each WUS in the paging narrow band. In an example, if the number of the group WUSs is 6, the frequency domain location of the WUS corresponding to each UE group ranges from {0, 1, 2, 3, 4, 5}, indicating the starting PRB locations of the WUSs in the paging narrow band, that is, the 0th PRB, the 1st PRB, the 2nd PRB, the 3rd PRB, the 4th PRB, and the 5th PRB in the paging narrow band. In another example, if the number of the group WUSs is 3, the frequency domain location of the WUS corresponding to each UE group ranges from {0, 2, 4}, indicating the starting PRB locations of the WUSs in the paging narrow band, that is the 0th PRB, the 2nd PRB, and the 4th PRB in the paging narrow band.

In an optional manner, the FDM may be adopted between multiple group WUSs, that is, the time domain locations of the group WUSs are identical, and the frequency domains are consecutive, wherein the starting freqLocation of any group WUS may be indicated in the cell system information block, and the freqLocation of another group WUS can be calculated from the freqLocation of the any group WUS and the WUS bandwidth. For example, the starting freqLocation of the WUS corresponding to the first UE group may be indicated, and the freqLocation of the WUS corresponding to another UE group is calculated from the starting freqLocation of the first group WUS and the WUS bandwidth.

As an example, the starting frequency domain location freqLocation_Group_n of the nth group WUS may be calculated according to the following formula:

$$\text{freqLocation\_Group\_}n = (\text{freqLocation\_Group\_1} + n * BW\_WUS) \% BW\_\text{Narrowband}$$

Wherein, the freqLocation_Group_1 is the starting frequency domain location of the first group WUS, which is configured in the cell system information, % indicates modulo operation, BW_WUS is the frequency domain bandwidth of the group WUS with PRB as the granularity, and BW_Narrowband is the bandwidth of paging narrow band with PRB as the granularity.

In an optional manner, the TDM or the CDM may be adopted between multiple group WUSs, that is, multiple group WUSs have the same frequency domain location, and should be configured by using the same freqLocation.

In the optional solution of the present application, after performing the WUS grouping based on the timeOffset type, and further grouping the WUSs under each timeOffset based on the ID of the UE, based on the Coverage Level, or based on the grouping configuration parameter. The TDM may be used for the group WUS under the same timeOffset, which are completely consecutive in time. The timeOffset configured in the cell system information may be the time offset between the WUS corresponding to the first UE group and the corresponding PO, the time offset between the WUS corresponding to the second UE group and the corresponding PO may be calculated from the time offset of the WUS corresponding to the first UE group and the maxDuration, and the time offset between the WUS corresponding to anther UE group and the corresponding PO may be calculated in the similar pattern.

For example, the maxDuration of the WUS corresponding to all the UE groups is identical, the WUSs corresponding to all the groups are completely consecutive in time, and the timeOffset of the WUS corresponding to the nth group may be calculated according to the following formula:

$$\text{timeOffset\_Group\_}n = \text{timeOffset\_Group\_1} + (n-1) * \text{maxDuration}$$

In this formula, the maxDuration is the maximum duration of WUS, of which the unit is ms, that is, the unit is a subframe; the timeOffset_Group_n is the time offset between the WUS corresponding to the nth UE group and the corresponding PO, wherein n may also be referred to as the ID of the UE group (i.e., the UEGroup_ID) and is in the range of 1 to numUEGroupBasedWUS; and the timeOffset_Group_1 is the time offset of the WUS corresponding to the first UE (i.e., the first group WUS) and the corresponding PO, which may be configured in the cell system information.

Figure 3:
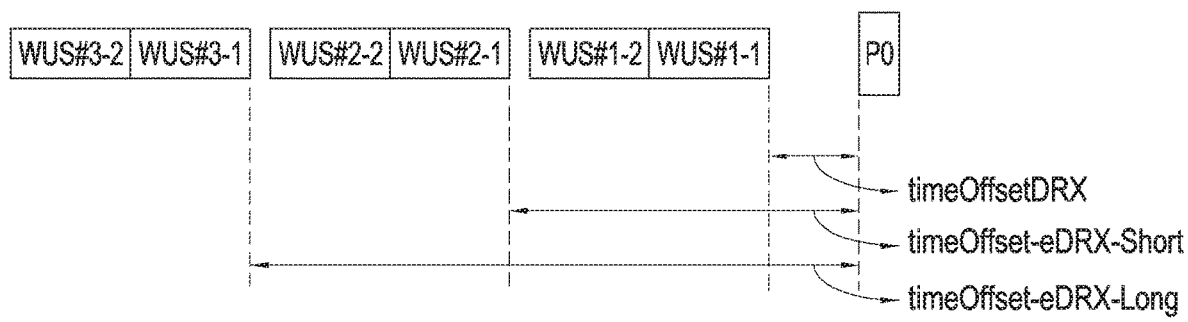
FIG. 3 illustrates a schematic diagram of TDM being adopted between group WUSs in same timeOffset in an example of the present application.

As an example, a schematic diagram of the TDM being adopted between WUSs corresponding to respective UE groups under the same timeOffset is shown in FIG. 3. In this example, the maximum duration of WUSs corresponding to all UE groups is identical. In the figure, the WUS #1-1 and the WUS #1-2 are the WUSs corresponding to two UE groups under the timeOffsetDRX, the WUS #2-1 and the WUS #2-2 are the WUSs corresponding to two UE groups under the timeOffset-eDRX-Short, and the WUS #3-1 and the WUS #3-2 are the WUSs corresponding to two UE groups under the timeOffset-eDRX-Long. When determining the time domain location of the WUS corresponding to the UE group to which the UE belongs, the UE first determines to use which one of the three types of timeOffsets, and then determines the WUS corresponding to the UE group to which the UE belongs according to the WUS grouping mode, that is, by determining which one of the WUSs corresponding to the 2 UE groups corresponding to the used timeOffset, to determine the time domain location of the WUS corresponding to the UE group to which the UE belongs.

Figure 4:
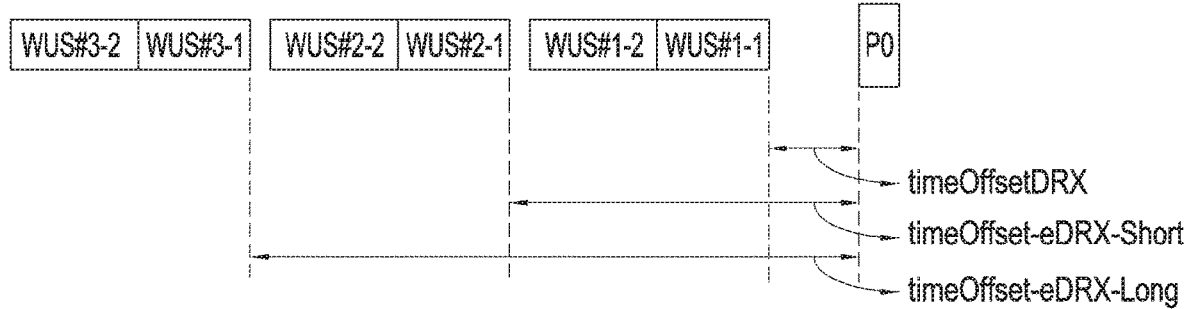
FIG. 4 illustrates a schematic diagram of TDM being adopted between group WUSs in same timeOffset in another example of the present application.

As an example, FIG. 4 shows a schematic diagram of adopting TDM between WUSs corresponding to each group under the same timeOffset. In this example, WUS #1-1 and WUS #1-2 are the WUSs corresponding to the two UE groups under timeOffsetDRX, WUS #2-1 and WUS #2-2 are the WUSs corresponding to the two UE groups under timeOffset-eDRX-Short, and WUS #3-1 and WUS #3-2 are the WUSs corresponding to the two UE groups under the timeOffset-eDRX-Long. The maximum duration of the WUS corresponding to each UE group under the same timeOffset differs. This example is mainly used for the WUS that grouping UEs according to the Coverage Level. The longer maximum duration of the WUS corresponds to the UE with the larger Coverage Level. In this example, the maxDuration and timeOffset configured in the cell system information may be the maxDuration and timeOffset of the WUS corresponding to the UE group of any of the Coverage Levels. For example, the maxDuration of the WUS corresponding to the UE group of the minimum Coverage Level may be configured, and the maxDuration of the WUS corresponding to the UE group of another Coverage Level may be obtained by enlarging a certain ratio of the maxDuration of the WUS corresponding to the UE group of the minimum Coverage Level, wherein the ratio may be a value prescribed in the system standard or configured in the cell system, for example, it may be the ratio shown in above Table 1. The timeOffset of the WUS corresponding to the UE group of another Coverage Level may be calculated from the timeOffset and maxDuration of the WUS corresponding to the UE group of the minimum Coverage Level.

Optionally, the maxDuration and timeOffset configured in the cell system information may also be used only for the WUS corresponding to the UE group of the maximum Coverage Level, and the maxDuration of the WUS of another Coverage Level is obtained by reducing a certain ration of the maxDuration of the WUS corresponding to the UE group of the maximum Coverage Level.

Optionally, for the WUS that being grouped by the Coverage Level, the actual transmission time of the WUS may be same with the maximum duration by default, which is different from the WUS of the existing system. In the existing system, the actual transmission time of the WUS may be less than the maximum duration.

In an optional solution of the present application, the TDM may be used between the WUSs corresponding to the UE groups under the same timeOffset, which are not consecutive in time, and the WUSs corresponding to the two adjacent UE groups may have a certain interval, which is a fixed value prescribed by the system standard or configured in the cell system information.

In an optional solution of the present application, for the MTC UE, the FDM may be used between the WUSs corresponding to the UE groups under the same timeOffset, that is, the time offset between each group WUS and the corresponding PO is identical and completely consecutive in the frequency domain; the freqLocation configured in the cell system information may be the starting frequency domain location of the WUS corresponding to the first UE group, and the starting frequency domain location of the WUS corresponding to another group may be derived from the freqLocation of the WUS corresponding to the first group and the frequency domain bandwidth of the WUS.

Figure 5:
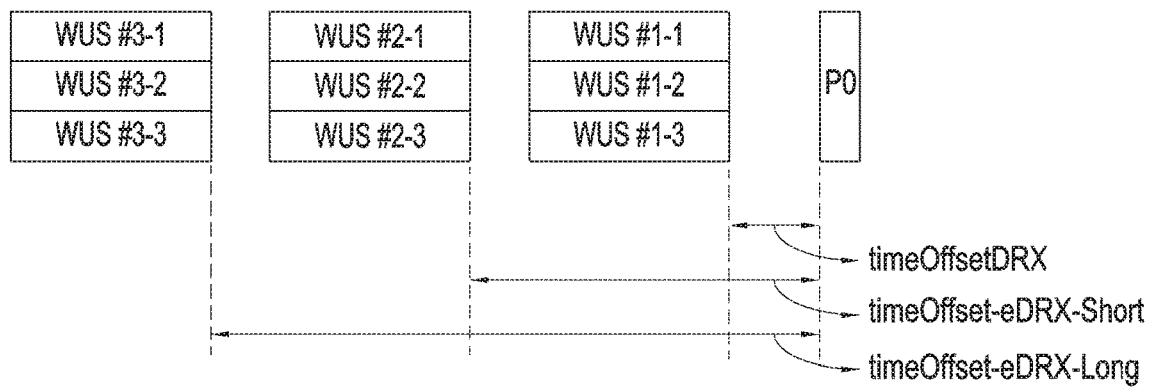
FIG. 5 illustrates a schematic diagram of Frequency Division Multiplexing (FDM) being adopted between group WUSs in same timeOffset in an example of the present application.

As an example, FIG. 5 is a schematic diagram of the FDM being adopted between WUSs corresponding to respective UE groups under the same timeOffset. In this example, the maximum duration of WUSs corresponding to all UE groups is identical. In the figure, WUS #1-1, WUS #1-2, and WUS #1-3 are the WUSs corresponding to the three UE groups under the timeOffsetDRX, WUS #2-1, WUS #2-2, and WUS #2-3 are the WUSs corresponding to the three UE groups under the timeOffset-eDRX-Short, and WUS #3-1, WUS #3-2, and WUS #3-3 are the WUSs corresponding to the three UE groups under the timeOffset-eDRX-Long. When receiving the configuration information of the UE group WUS, the UE first determines to use which one of the three types of timeOffsets, that is, UE first determines the time domain location of the corresponding WUS, and then determines the WUS corresponding to the UE group to which the UE belongs according to the UE grouping manner, that is, UE determines which one of the WUSs corresponding to the three UE groups, thereby determining the frequency domain location of the corresponding WUS.

Figure 6:
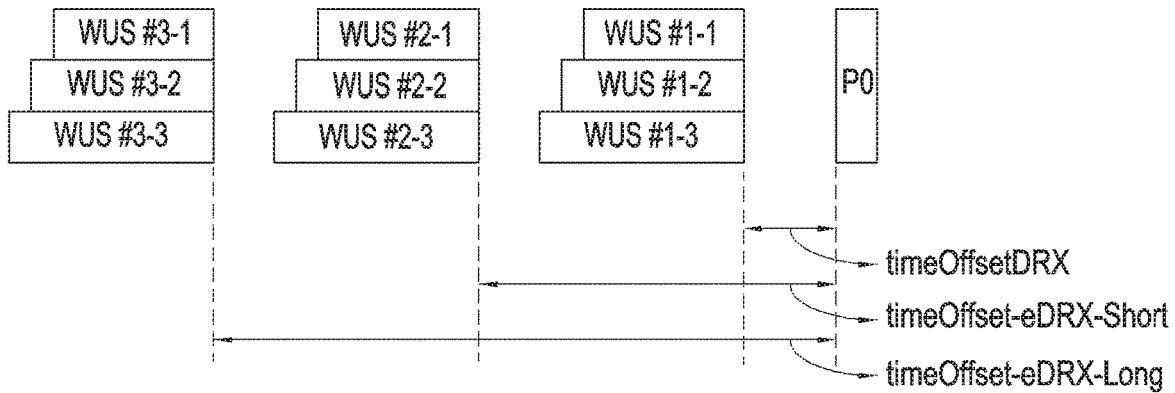
FIG. 6 illustrates a schematic diagram of FDM being adopted between group WUSs in same timeOffset in another example of the present application.

As an example, FIG. 6 is a schematic diagram of the FDM being adopted between WUSs corresponding to respective UE groups under the same timeOffset. In this example, the maximum duration of WUSs corresponding to respective UE groups under the same timeOffset are different. The scenario is mainly used for the WUS grouping the UEs according to the Coverage Level. The UE with the larger Coverage Level is, the longer the maximum duration of the WUS corresponding to the UE is. In this example, the maxDuration configured in the cell system information may be used only for the WUS corresponding to the UE group with the minimum or maximum Coverage Level, and the maxDuration of the WUS corresponding to the UE group of another Coverage Level may be analogically calculated with reference to the example described in FIG. 4.

In the optional solution of the present application, the CDM may be adopted between the WUSs corresponding to respective UE groups in the same timeOffset, that is, the time offset between the WUS corresponding to each UE group and the corresponding PO is identical, and the starting frequency domain location and the maximum duration are also identical. The WUSs corresponding to different UE groups may be distinguished by using different orthogonal covering codes (OCC).

Figure 7:
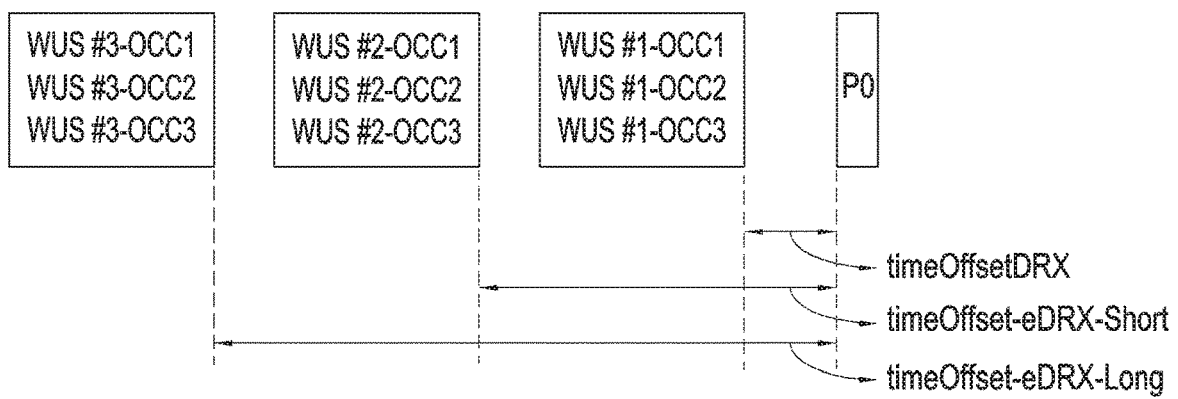
FIG. 7 illustrates a schematic diagram of Code Division Multiplexing (CDM) being adopted between group WUSs in same timeOffset in an example of the present application.

As an example, FIG. 7 shows a schematic diagram of the CDM being adopted between WUSs corresponding to respective UE groups under the same timeOffset. In the figure, WUS #1-OCC1, WUS #1-OCC2, and WUS

1-OCC3 are the WUSs corresponding to the three UE groups under the timeOffsetDRX; WUS #2-OCC1, WUS #2-OCC2, and WUS #2-OCC3 are the WUSs corresponding to the three UE groups under the timeOffset-eDRX-Short, and WUS #3-OCC1, WUS #3-OCC2, and WUS #3-OCC3 are the WUSs corresponding to the three UE groups under the timeOffset-eDRX-Long. After receiving the configuration information of the UE group WUS, the UE first determines to use which one of the three types of timeOffsets, that is, UE determines the time-frequency domain location of the corresponding WUS, and then determines the ID of the UE group to which the UE belongs according to the UE grouping manner, that is, UE determines which one of the three WUSs, thereby determining the OCC used by the corresponding WUS.

In an optional manner of the present application, the maximum duration of the Rel-16 group WUS (the WUS grouped based on the UE in the embodiment of the present application) may be consistent with the maximum duration of the Rel-15 WUS, that is, they may be configured by using a same parameter (maxDurationFactor), which the similar parameter further includes the number of the POs (numPOs) corresponding to one WUS for the eDRX UE.

In an optional solution of the present application, the time-frequency domain location (that is the time domain location and the frequency domain location) of the Rel-16 group WUS may be unrelated to the time-frequency domain location of the Rel-15 WUS, that is, they are configured by using different parameters (including the timeOffset and the freqLocation) respectively.

In an optional solution of the present application, the time-frequency domain location of the Rel-16 group WUS may be related to the time-frequency domain location of the Rel-15 WUS, that is, they are configured by using same parameters (including the timeOffset and/or the freqLocation). The correlation between the time-frequency domain location of the Rel-16 group WUS and the time-frequency domain location of the Rel-15 WUS may be represented by consecutive time domain (TDM) or consecutive frequency domain (FDM).

Figure 8:
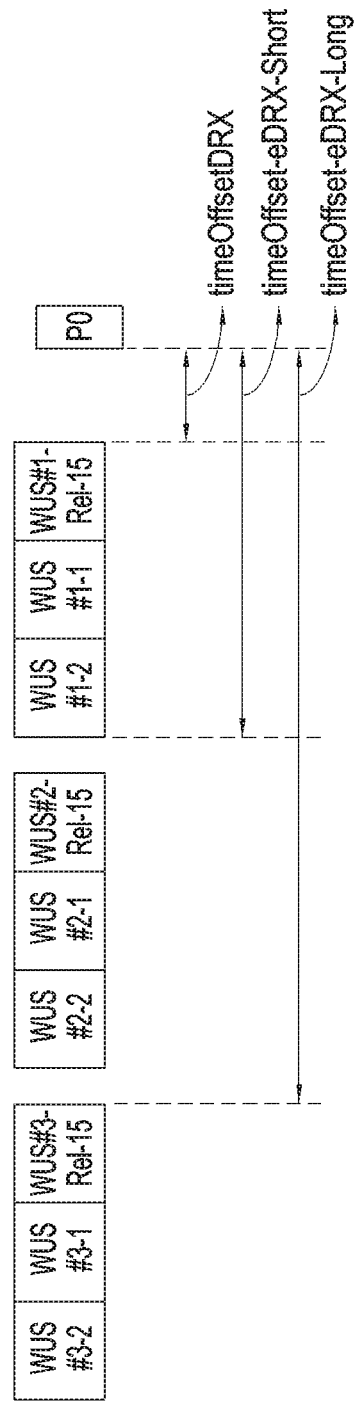
FIG. 8 illustrates a schematic diagram of TDM being adopted between a Rel-16 group WUS and a Rel-15 WUS in same timeOffset in an example of the present application.

As an example, FIG. 8 shows a schematic diagram of the TDM being used for the Rel-16 group WUS and the Rel-15 WUS under the same timeOffset. In FIG. 8, WUS #1-Rel-15 is the WUS of the Rel-15 DRX UE; WUS #1-1 and #1-2 are the WUSs corresponding to the two UE groups of the Rel-16 DRX UE; WUS #2-Rel-15 is the WUS monitored by the Rel-15 eDRX UE based on the short timeOffset; WUS #2-1 and WUS #2-2 are the WUSs corresponding to the two UE groups monitored by the Rel-16 eDRX UE based on the short timeOffset; WUS #3-Rel-15 is the WUS monitored by the Rel-15 eDRX UE based on the long timeOffset; WUS #3-1 and WUS #3-2 are the WUSs corresponding to the two UE groups monitored by the Rel-16 eDRX UE based on the long timeOffset.

In the example shown in FIG. 8, under the same timeOffset, the Rel-16 group WUS has the same frequency domain location as the Rel-15 WUS, is completely consecutive in the time domain, and has the same maximum duration. In this example, the TDM is also used between the Rel-16 group WUSs, as in the description in the example shown in FIG. 3. The timeOffset indicated by the cell system information is used for the Rel-15 WUS, and the timeOffset of the Rel-16 group WUS may be calculated according to the timeOffset and maxDuration of the Rel-15 WUS.

Figure 9:
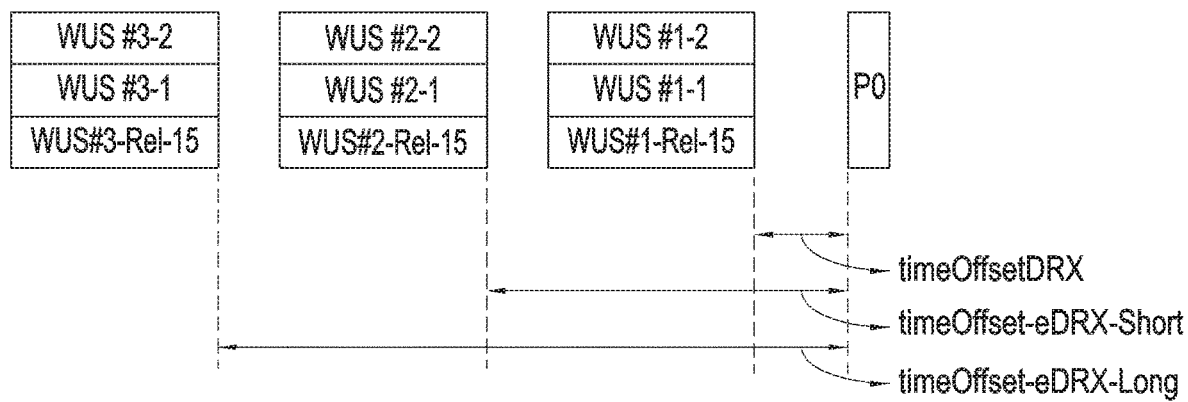
FIG. 9 illustrates a schematic diagram of FDM being adopted between a Rel-16 group WUS and a Rel-15 WUS in same timeOffset in an example of the present application.

As an example, FIG. 9 shows a schematic diagram of the FDM being used for the Rel-16 group WUS and the Rel-15 WUS under the same timeOffset. The meaning of each parameter shown in the figure is consistent with that of each parameter shown in FIG. 8. In this example, under the same timeOffset, the Rel-16 group WUS has the same time domain location as the Rel-15 WUS, is completely consecutive in the frequency domain, and has the same maximum duration. The FDM is also used between the Rel-16 group WUSs, as in the description in the example shown in FIG. 5. The freqLocation configured by the cell system information is used for the Rel-15 WUS, and the freqLocation of the Rel-16 group WUS may be calculated according to the freqLocation of the Rel-15 WUS and bandwidth of WUS. The meaning of each parameter shown in FIG. 9 is consistent with that of each parameter shown in FIG. 8.

As an example, FIG. 10 shows a schematic diagram of FDM+TDM being used for the Rel-16 group WUS and the Rel-15 WUS under the same timeOffset. Wherein, WUS #1-Rel-15 is the WUS of Rel-15 DRX UE; WUS #1-1 and WUS #1-2, WUS #1-3, WUS #1-4, WUS #1/5 are the WUSs corresponding to the five UE groups of the Rel-16 DRX UE; WUS #2-Rel-15 is the WUS monitored by the Rel-15 eDRX UE based on the short timeOffset; WUS #2-1, WUS #2-2, . . . , and WUS #2-5 are the WUSs corresponding to the five UE groups monitored by the Rel-16 eDRX UE based on the short timeOffset; WUS #3-Rel-15 is the WUS monitored by the Rel-15 eDRX UE based on the long timeOffset; WUS #3-1, WUS #3-2, . . . , and WUS #3-5 are the WUSs corresponding to the five UE groups monitored by the Rel-16 eDRX UE based on the long timeOffset. In this example, FDM+TDM is also used between Rel-16 group WUSs. This case is mainly due to that the number of WUSs that may be multiplexed in a narrow band of MTC is limited, and more group WUSs may be supported by FDM+TDM.

As an example, FIG. 11 shows a schematic diagram of the TDM being used for the Rel-16 group WUS and the Rel-15 WUS under the same timeOffset, wherein WUS #1-Rel-15 is the WUS of the Rel-15 DRX UE; WUS #2-Rel-15 is the WUS monitored by the Rel-15 eDRX UE based on the short timeOffset; WUS #3-Rel-15 is the WUS monitored by the Rel-15 eDRX UE based on the long timeOffset; WUS #1-1, WUS #1-2 and WUS #1-3 are the WUSs corresponding to the three UE groups of the Rel-16 DRX UE; WUS #2-1, WUS #2-2 and WUS #2-3 are the WUSs corresponding to the three UE groups monitored by the Rel-16 eDRX UE based on the short timeOffset; WUS #3-1, WUS #3-2 and WUS #3-5 are the WUSs corresponding to the three UE groups monitored by the Rel-16 eDRX UE based on the long timeOffset. In this example, the FDM is used between Rel-16 group WUSs. The timeOffset and freqLocation configured by the cell system information are used for the Rel-15 WUS, and the timeOffset and freqLocation of the Rel-16 group WUS may be calculated according to the timeOffset and freqLocation of the Rel-15 WUS, the maxDuration and WUS bandwidth.

It may be understood that in the foregoing various optional solutions and examples, the solutions and examples of the TDM, FDM, and CDM may be used for the MTC UE, but for the NB-IOT UE, only the TDM and CDM may be used.

In an optional solution of the present application, the configuration information of the UE group WUS may further include the number of a plurality of consecutive POs corresponding to the WUSs corresponding to the UE group (numPOs-GroupBasedWUS), and the parameter is applicable to the eDRX UE, which parameter represents the number of consecutive multiple POs corresponding to one WUS and may be in the range of {1, 2, 4}. Wherein, multiple group WUSs should use the same numPOs configuration.

In an optional implementation of the present application, the method may further include:

determining whether there is an overlap between the WUS corresponding to the UE group to which the UE belongs and the WUS corresponding to another UE group, and/or whether there is an overlap between the WUS corresponding to the UE group to which the UE belongs and the WUS corresponding to the ungrouped UE;

if there is an overlap, processing the WUS corresponding to the overlap correspondingly according to a pre-configured overlap processing strategy when monitoring the WUS.

The overlap processing strategy includes but is not limited to, for example, direct discarding, still normally receiving, or the like.

In the embodiment of the present application, the UE may determine the time domain location and the maximum duration of the WUS corresponding to the UE group to which the UE belongs according to the configuration information of the UE group WUS (including the timeOffset, the maxDurationFactor, etc.), and the UE may determine the time domain location and the maximum duration of the WUS corresponding to the UE group to which another UE belongs, as well as the time domain location and the maximum duration of the Rel-15 WUS, in addition to the time domain location and the maximum duration of the WUS corresponding to the UE group to which the UE belongs.

In practical applications, there may be an overlap between multiple Rel-16 group WUSs or between Rel-16 group WUS and Rel-15 WUS, which are configured by the base station, and the UE may process the overlap based on the overlap processing strategy. Wherein, the processing method of the overlap may have a certain relationship with the location of the overlap.

Figure 12:
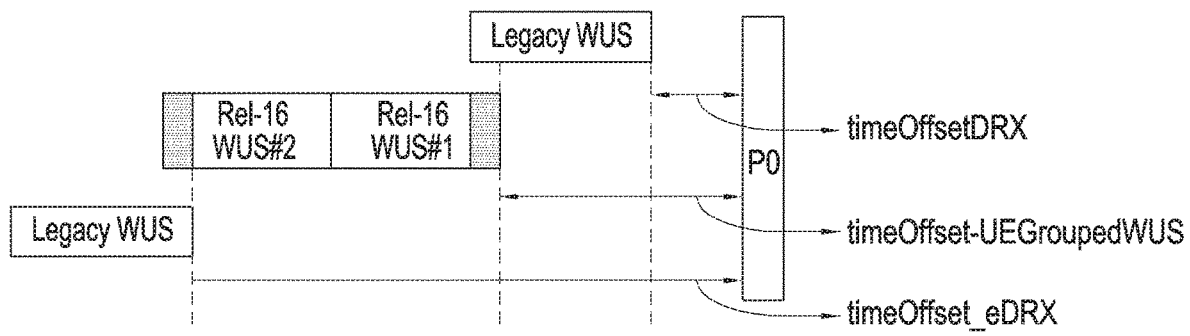
FIG. 12 illustrates a schematic diagram of a WUS overlap in an example of the present application.

As an example, FIG. 12 shows a schematic diagram of WUS overlap. As shown in the figure, There are overlaps between two consecutive Rel-16 group WUSs (Rel-16 WUS #1 and Rel-16 WUS #2) and Rel-15 WUS (i.e., Legacy WUS shown in the figure), that is, the overlap between the tail of a Rel-16 group WUS and the head of the WUS of the Rel-15 DRX UE, and the overlap between the head of the Rel-16 group WUS and the tail of the WUS of the Rel-15 eDRX UE. In an optional manner, if the tail of the Rel-16 WUS overlaps with the head of the Rel-15 WUS, the Rel-16 UE should discard the tail of the Rel-16 WUS when detecting the Rel-16 WUS, that is, the head of the Rel-15 WUS has a higher priority than the tail of the Rel-16 WUS. Wherein, the timeOffset-UEGroupedWUS shown in the figure represents the time offset between the Rel-16 group WUS and the corresponding PO, and the timeOffset-DRX represents the time offset of the Rel-15 WUS on the right side of the figure and the corresponding PO, the timeOffset-eDRX represents the time offset of the Rel-15 WUS on the left side of the figure and the corresponding PO.

When the head of the Rel-16 WUS overlaps with the tail of the Rel-15 WUS, the Rel-16 UE may have multiple processing methods. In an optional manner, when the Rel-16 UE detects the Rel-16 WUS, the header of the Rel-16 WUS is still considered valid, and the base station should also ensure the actual transmission of the head of the Rel-16 WUS, that is, the portion of the Rel-15 WUS overlapping with the head of the Rel-16 WUS should not be actually transmitted and the head of the Rel-16 WUS has a higher priority than the tail of the Rel-15 WUS. In another optional manner, if the head of the Rel-16 WUS overlaps with the tail of the Rel-15 WUS, the Rel-16 UE should discard the head of the Rel-16 WUS when detecting the Rel-16 WUS, that is, the tail of the Rel-15 WUS has a higher priority than the head of the Rel-16 WUS. In a further optional manner, if the head of the Rel-16 WUS overlaps with the tail of the Rel-15 WUS, the UE should discard the head of the Rel-16 WUS when detecting the Rel-16 WUS, assuming the starting location of the WUS is delayed to the nearest location without overlap, and generate the sequence of the WUS from this starting location. That is, when the head of the Rel-16 WUS overlaps with the tail of the Rel-15 WUS, the starting location of the Rel-16 WUS is automatically delayed and the end location of the Rel-16 WUS is also delayed accordingly.

Figure 13:
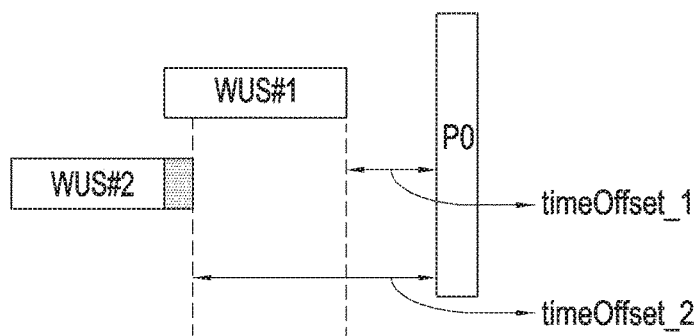
FIG. 13 illustrates a schematic diagram of a WUS overlap in another example of the present application.

As an example, FIG. 13 shows a schematic diagram of WUS overlapping, in which WUS #1 and WUS #2 represent two Rel-16 group WUSs, and timeOffset_1 and timeOffset_2 represent the time offsets between two Rel-16 group WUSs and corresponding POs. As shown in the figure, there is an overlap between the Rel-16 group WUSs. The two group WUSs time division multiplexed are configured with different timeOffsets, and there may be an overlap between the configured two groups WUS. In this example, the UE group corresponding to the group WUS #2 may discard the overlap when detecting the group WUS #2, and the UE group corresponding to the group WUS #1 may perform the normal reception on the overlap when detecting the group WUS #1, that is, the header of the group WUS has a higher priority than the tail of the group WUS.

In an optional implementation of the present application, the WUS corresponding to each UE group is generated based on at least one of the following information:

an ID of the WUS corresponding to the UE group;

a starting frame of the PO corresponding to the WUS corresponding to the UE group;

a starting timeslot of the PO corresponding to the WUS corresponding to the UE group;

a physical ID of the cell corresponding to the UE group;

a time domain starting location of the WUS corresponding to the UE group;

a configuration parameter of the WUS corresponding to the UE group.

The WUS corresponding to each UE group is a WUS sequence, and each WUS sequence may be generated based on an initialization seed of each WUS sequence.

In one example, the ID of each UE group (i.e., $G_{ID}^{WUS}$, the ID of the WUS corresponding to the UE group) may be used to calculate the seed for initialization $C_{init\_WUS}$ generated by the corresponding WUS sequence (WUS sequence is also the WUS). For example, assuming that the system supports up to N WUS groups, then $C_{init\_WUS}$ is $$C_{init\_WUS} = (N_{ID}^{cell} + 1) \left( \left( (N+1) * 10 n_{f\_start\_P0} + (N+1) * \left\lfloor \frac{n_{s\_start\_P0}}{2} \right\rfloor + G_{ID}^{WUS} + 1 \right) \mod 2048 + 1 \right) 2^9 + N_{ID}^{cell}$$

Wherein, $n_{f\_start\_P0}$ is the starting radio frame index of the corresponding PO, $n_{s\_start\_P0}$ is the starting timeslot index of the corresponding PO, $N_{ID}^{cell}$ is the physical ID of the cell, and mod represents the modulo operation.

In a further example, the group WUS sequence uses the following $C_{init\_WUS}$ $$C_{init\_WUS} = (N_{ID}^{cell} + 1)$$

$$\left(\left(10n_{f\_start\_P0} + \left\lfloor \frac{n_{s\_start\_P0}}{2} \right\rfloor + G_{ID}^{WUS} + 1\right) \bmod 2048 + 1\right)2^9 + N_{ID}^{cell}$$

In a further example, the group WUS sequence uses the following $C_{init\_WUS}$ $$C_{init\_WUS} = (G_{ID}^{WUS} + 1)(N_{ID}^{cell} + 1)$$

$$\left(\left(10n_{f\_start\_P0} + \left\lfloor \frac{n_{s\_start\_P0}}{2} \right\rfloor\right) \bmod 2048 + 1\right)2^9 + N_{ID}^{cell} + G_{ID}^{WUS}$$

In a further example, $C_{init\_WUS}$ is determined based on the time domain starting location of the group WUS, $$C_{init\_WUS} =$$
$$(N_{ID}^{cell} + 1)\left(\left(10n_{f\_start\_WUS} + \left\lfloor \frac{n_{s\_start\_WUS}}{2} \right\rfloor\right) \bmod 2048 + 1\right)2^9 + N_{ID}^{cell}$$

Wherein, $n_{f\_start\_WUS}$ is the starting radio frame index of the corresponding group WUS, and $n_{s\_start\_WUS}$ is the starting timeslot index of the corresponding group WUS.

In another example, the cell system information may configure a parameter for generating $C_{init\_WUS}$ together when configuring the group WUS, and for example, $n_{WUS}$ in the following formula is the base station configuration.

$$C_{init\_WUS} =$$
$$(N_{ID}^{cell} + 1)\left(\left(10n_{f\_start\_P0} + \left\lfloor \frac{n_{s\_start\_P0}}{2} \right\rfloor\right) \bmod 2048 + 1\right)2^9 + N_{ID}^{cell} + n_{WUS}$$

In another example, the multiple group WUS sequences corresponding to the same PO may be generated by using the same seed for initialization $C_{init\_WUS}$.

In another example, the WUS sequences corresponding to the multiple UEs corresponding to the same PO may be obtained by dividing the same WUS sequence. For example, for the WUSs corresponding to the two UE groups corresponding to one PO, a long Rel-15 WUS sequence may be generated in accordance with the generating method of the Rel-15 WUS, and then the long sequence is divided into two sub-sequences, which used for the WUSs corresponding to the two UE groups.

In an optional implementation of the present application, in Step S130, the monitoring the WUS corresponding to the UE group to which the UE belongs, may include:

monitoring a common WUS in each paging cycle of the PO, wherein the common WUS is a WUS that all UEs need to monitor;

monitoring the WUS corresponding to the UE group to which the UE belongs when the common WUS is not monitored in the paging cycle;

monitoring the PO corresponding to the paging cycle when the common WUS is monitored in the paging cycle.

If the paging channel includes a paging message from the RAN side, all UEs corresponding to the paging channel should decode the paging channel, and the WUS based on the UE group may consume more system resources due to that each group WUS is transmitted to wake up the corresponding group of UEs. To save system resources, in the embodiment of the present application, a common WUS (Group-Common WUS) that all UEs need to monitor is introduced, so that when the paging channel includes the paging message from the RAN side, the base station may only transmit the Group-Common WUS without transmitting all the group WUSs, and the time-frequency resource originally reserved for the group WUS may be used by the base station for other purposes, thereby improving the efficiency of using system resources.

When the paging channel includes the paging message from the RAN side, the base station should only transmit the Group-Common WUS rather than the UE-Group-based WUS no matter whether the CN side paging information is included or not, so as to wake up all UEs that need to monitor the PO. When the paging channel only includes the paging message from the CN side, the base station should only transmit the UE-Group-based WUS corresponding to the UE group to which the paged UE belongs, rather than the Group-Common WUS, so as to wake up the UE group to which the paged UE belongs. That is, the Group-Common WUS and the UE-Group-based WUS are not transmitted simultaneously in the same paging cycle.

Figure 14:
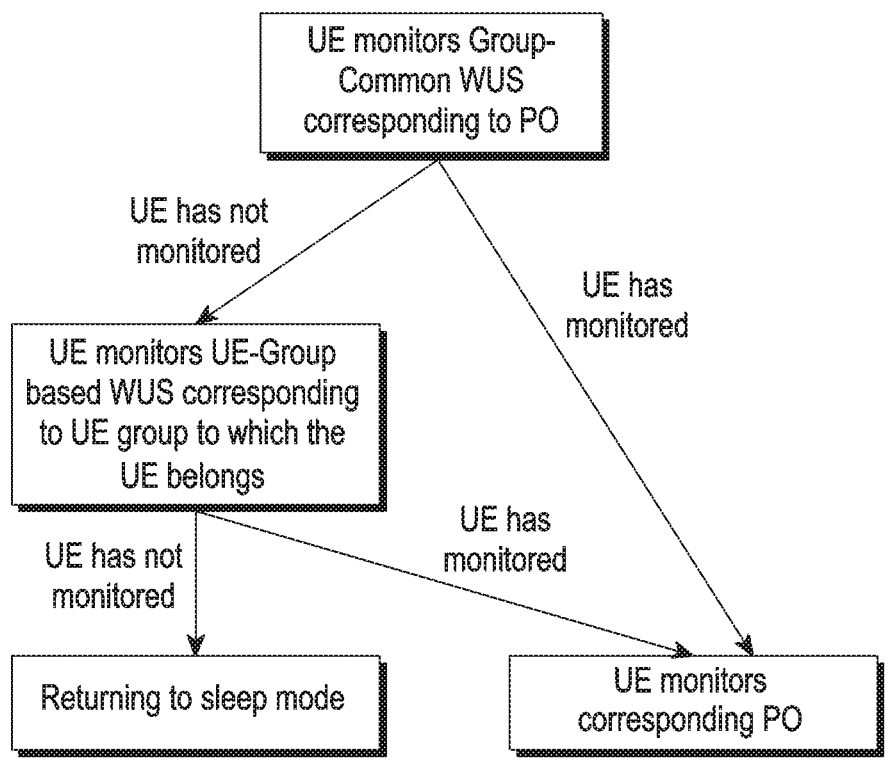
FIG. 14 illustrates a schematic flowchart of a WUS monitoring manner in an embodiment of the present application.

FIG. 14 is a schematic flowchart of a method for monitoring a wake-up signal in an optional solution of the present application. As shown in the figure, in a paging cycle, the UE may first monitor the Group-Common WUS, and if the UE has monitored the Group-Common WUS, then the UE needs to monitor the corresponding PO; if the UE has not monitored the Group-Common WUS, the UE needs to monitor the UE-Group-based WUS corresponding to the UE group to which the UE belongs; if the UE has monitored the UE-Group-based WUS, then the UE needs to monitor the corresponding PO; if the UE has not monitored the UE-Group-based WUS, the UE returns to the sleep mode until the next paging cycle.

When the UE supports the Group-Common WUS and the group WUS, and the network also provides the configuration information of the Group-Common WUS and the group WUS, the UE should monitor the corresponding Group-Common WUS according to the Group-Common WUS parameter provided in the system information. When the DRX is used and the UE has detected the Group-Common WUS, the UE should monitor the corresponding PO. When eDRX is used and the UE has detected the Group-Common WUS, the UE should monitor the corresponding multiple POs (numPOs), until receiving the paging message. If the UE has not detected the Group-Common WUS, the UE should further monitor the corresponding group WUS according to the group WUS parameter provided in the system information. If the corresponding group WUS is detected, the UE should monitor the corresponding PO or multiple POs (numPOs), otherwise, there is no need to monitor the corresponding PO or multiple POs (numPOs). Herein, the numPOs is a configuration parameter provided by system information, and refers to the number of consecutive POs corresponding to one group WUS.

In an optional implementation of the present application, the method may further include:

receiving a monitoring cycle of the common WUS;

and if the paging cycle of the PO is different from the monitoring cycle of the common WUS, the monitoring the WUS corresponding to the UE group to which the UE belongs includes:

determining the paging cycle including the WUS corresponding to the UE group to which the UE belongs, and/or the paging cycle including the common WUS according to the monitoring cycle of the common WUS and the paging cycle of the PO;

monitoring the WUS corresponding to the UE group to which the UE belongs and/or monitoring the common WUS in the corresponding paging cycle according to the paging cycle including the WUS corresponding to the UE group to which the UE belongs, and/or the paging cycle including the common WUS.

In an optional implementation of the present application, the monitoring the WUS corresponding to the UE group to which the UE belongs and monitoring the common WUS in the corresponding paging cycle, may include:

monitoring the common WUS in the corresponding paging cycle;

monitoring the WUS corresponding to the UE when the common WUS is not monitored in the corresponding paging cycle, and monitoring the PO corresponding to the paging cycle if the WUS is monitored.

In an optional implementation of the present application, the monitoring cycle of the common WUS is a default paging cycle configured in cell system information, that is, a paging cycle on the RAN side or a default paging cycle configured in the cell system information.

The paging cycle of the RAN side paging information may be different from the paging cycle of the CN side paging information. The paging cycle of the RAN side paging information should be determined by the base station, that is, the default paging cycle of the cell broadcast in the existing system may be configured by the base station according to the network condition, for example, the update frequency of the system information. The paging cycle of the CN side paging information is determined by the CN, that is, the UE-specific Paging Cycle configured by the CN in the existing system may be configured by the CN according to the service attribute of the UE, such as the response delay requirement of the service. In the existing system, the paging cycle of the paging channel is the minimum value of the Default Paging Cycle and the UE-specific Paging Cycle.

In order to further reduce power consumption of the UE and improve system resource usage efficiency, the Group-Common WUS (for waking up the UE to receive RAN side paging information) and the UE-Group-based WUS (for waking up the UE to receive CN side paging information) may be configured with different cycles. For example, the Group-Common WUS is monitored based on the default paging cycle, and the UE-Group-based WUS is monitored based on the UE-specific paging cycle.

In an optional solution, regardless whether the UE is configured with a UE-specific paging cycle and regardless whether the UE-specific Paging Cycle is equal to the Default Paging Cycle of the cell broadcast, for the UE, one PO may correspond to one Group-Common WUS and multiple UE-Group-based WUS within each paging cycle.

In an optional solution, when a UE is configured with a UE-specific Paging Cycle and the UE-specific Paging Cycle is equal to or greater than the Default Paging Cycle of the cell broadcast, for the UE, one PO will correspond to one Group-Common WUS and multiple UE-Group-based WUS within each paging cycle.

In an optional solution, when a UE is configured with a UE-specific Paging Cycle and the UE-specific Paging Cycle is less than the Default Paging Cycle of the cell broadcast, for the UE, one PO may correspond to one Group-Common WUS and multiple UE-Group-based WUSs within some paging cycle; one PO may only correspond to multiple UE-Group-based WUSs within some paging cycle.

In an optional solution, the Group-Common WUS and the UE-Group-based WUS use the same time-frequency resource, which may be distinguished by the UE by different WUS sequences.

In an optional solution, the Group-Common WUS and the UE-Group-based WUS may use different time-frequency resources.

In the actual application, the Group-Common WUS may be consistent with the maximum duration of the UE-Group-based WUS by default. If the maximum duration of multiple UE-Group-based WUSs differs, for example, the WUS groups the UEs based on the Coverage Level and the Group-Common WUS defaults that the maximum duration of the UE-Group-based WUS with maximum Coverage Level is identical.

In practical applications, the UE may determine whether to monitor the Group-Common WUS and/or the UE-Group-based WUS in a paging cycle according to the UE-specific Paging Cycle configured by the upper layer signaling and the Default Paging Cycle of the cell broadcast; if the UE-specific Paging Cycle is equal to the Default Paging Cycle, or the UE-specific Paging Cycle is greater than the Default Paging Cycle of the cell broadcast, then the UE considers that the Group-Common WUS and the UE-Group-based WUS are needed to be monitored in each paging cycle, wherein the UE-Group-based WUS is monitored only after the Group-Common WUS is not monitored. If the UE-specific Paging Cycle is less than the Default Paging Cycle, the UE considers that both the Group-Common WUS and the UE-Group-based WUS are needed to be monitored in some paging cycles, wherein the UE-Group-based WUS is monitored only after the Group-Common WUS is not monitored; in some paging cycles, the UE only monitors the UE-Group-based WUS.

Wherein, the Group-Common WUS is monitored based on the Default Paging Cycle, and the UE-Group-based WUS is monitored based on the UE-specific Paging Cycle. The paging cycle of the PO is the minimum value of the UE-specific Paging Cycle and the Default Paging Cycle.

Figure 15:
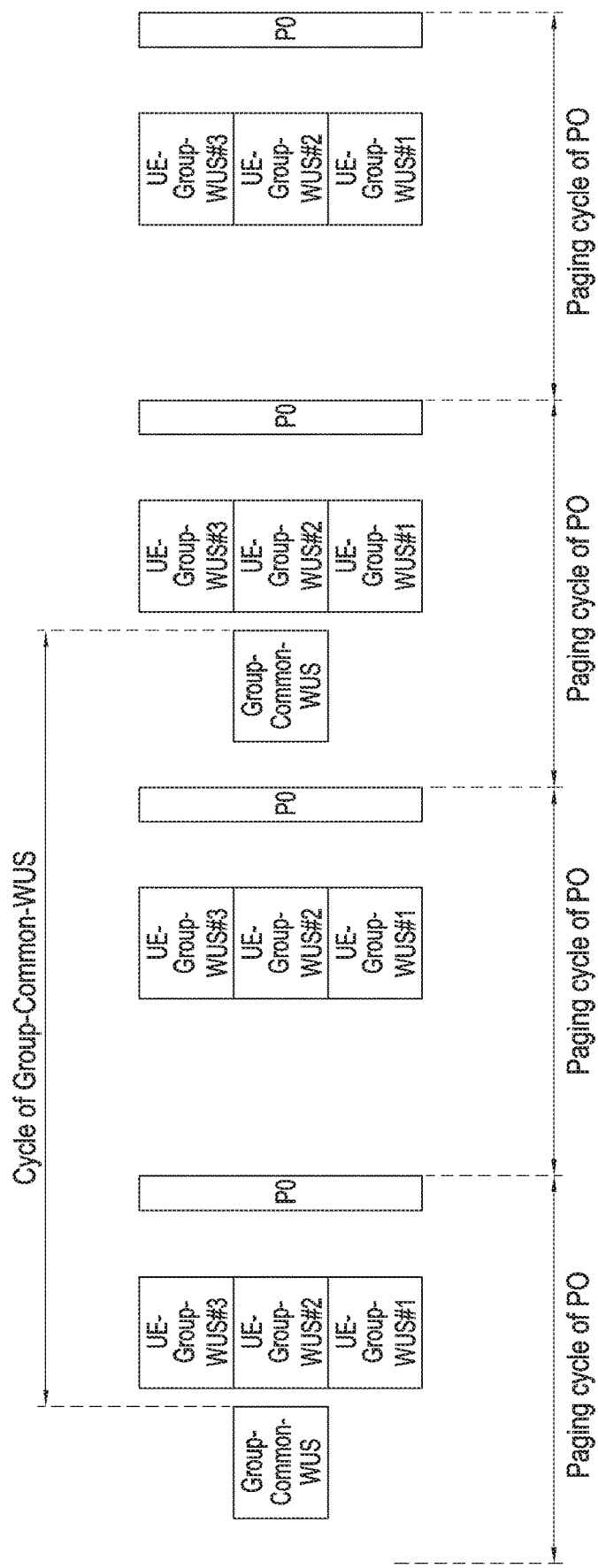
FIG. 15 illustrates a schematic diagram of a WUS monitoring manner when the paging cycle is different from the monitoring cycle of the common WUS in an example of the present application.

As an example, FIG. 15 shows a schematic diagram of a UE-specific Paging Cycle being less than the Default Paging Cycle. As shown in the figure, the cycle of the Group-Common WUS indicates the monitoring cycle of the common WUS; UE-Group-WUS #1, UE-Group-WUS #2, and UE-Group-WUS #3 are the WUSs corresponding to the three UE groups, and the paging cycle of the PO is the minimum value of the UE-specific Paging Cycle and the Default Paging Cycle, that is, the paging cycle of the PO is the UE-specific Paging Cycle. As may be seen from the figure, in some PO paging cycles, the UE only monitors the UE-Group-based WUS corresponding to the UE group to which the UE belongs, and if a UE-Group-based WUS has been monitored in these paging cycles, the UE needs to further monitor the PO, and if the UE-Group-based WUS is not monitored, the UE returns to the sleep mode.

In an optional solution, when the UE-specific Paging Cycle is less than the Default Paging Cycle, the UE determines the paging cycle of the Group-Common WUS that needs to be monitored by the following formula:

$$UE\_ID \% N = PO\_n \% N \quad (1)$$

Wherein, the PO_n is the serial number of the PO, which starts from the PO that needs to be monitored after the SFN (System Frame Number)=0, and UE_ID=IMSI % 16384, where % represents the modulo operation.

Herein, N=floor(Default-pagingCycle/UE-specific-pagingCycle), PO_n indicates POs for which the UE monitors the UE-Group-based WUS and the Group-Common WUS. For POs other than PO_n, the UE only needs to monitor the UE-Group-based WUS.

Figure 16:
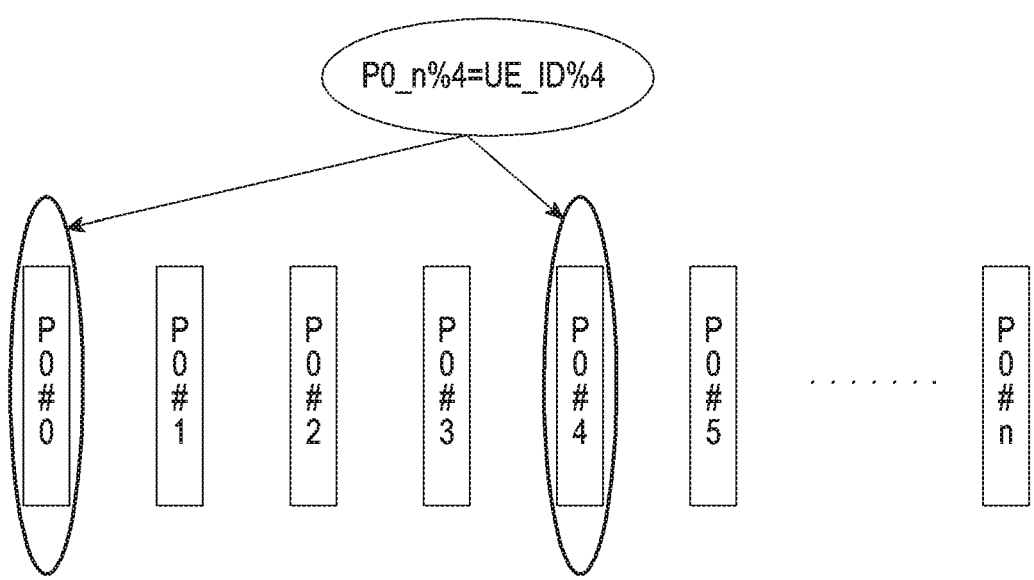
FIG. 16 illustrates a schematic diagram of determining to monitor the paging cycles of a common WUS and/or the WUS based on the UE group in an example of the present application.

As an example, as shown in FIG. 16, when the Default-pagingCycle is 64 ms and the UE-specific Paging Cycle is 256 ms, it may be understood based on the formula (1) that the Group-Common WUS and the UE-Group-based WUS are needed to be monitored in only one PO paging cycle in each 4 PO paging cycles, only the Group-Common WUS is needed to be monitored in other PO paging cycles. As shown in the figure, the Group-Common WUS and UE-Group-based WUS may be monitored during a paging cycle such as the first PO paging cycle (PO #0 shown in the figure) and the fifth PO paging cycle (PO #4 shown in the figure).

In an optional solution, the UE determines the paging cycle in which the Group-Common WUS and the UE-Group-based WUS that need to be monitored by using the following formula:

$$PO\_n \% N=0 \quad (2)$$

That is, in which paging cycle the Group-Common WUS and the UE-Group-based WUS are needed to be monitored is determined by the formula (2), which is independent of the UE_ID, and the Group-Common WUS and the UE-Group-based WUS are needed to be monitored in the first PO of every N POs by default.

In an optional implementation of the present application, the method may further include:

receiving the monitoring cycle of the common WUS;

receiving the monitoring cycle of the WUS corresponding to the UE group to which the UE belongs;

and the monitoring the WUS corresponding to the UE group to which the UE belongs, includes:

determining the paging cycle including the WUS corresponding to the UE group to which the UE belongs, and/or the paging cycle including the common WUS according to the paging cycle, the monitoring cycle of the common WUS, and the monitoring cycle of the WUS corresponding to the UE group to which the UE belongs;

monitoring the WUS corresponding to the UE and/or monitoring the common WUS in the corresponding paging cycle according to the paging cycle including the WUS corresponding to the UE group to which the UE belongs, and/or the paging cycle including the common WUS.

In an optional solution of the present application, the monitoring cycle of the common WUS is a default paging cycle configured in cell system information, and the monitoring cycle of the WUS corresponding to the UE group to which the UE belongs is a UE-specific paging cycle configured by the core network (CN).

In an optional solution, the Group-Common WUS and the UE-Group-based WUS may use different monitoring cycles for the same UE, and the UE-Group-based WUS corresponding to different UE groups may also use different monitoring cycles. Herein, the Group-Common WUS may be monitored based on the Default-pagingCycle of the cell broadcast configuration, and the UE-Group-based WUSs corresponding to different UE groups may be grouped according to different values of the UE-specific-paging-Cycle, that is, each UE-Group-Based WUS is monitored based on its corresponding UE-specific-pagingCycle.

Figure 17:
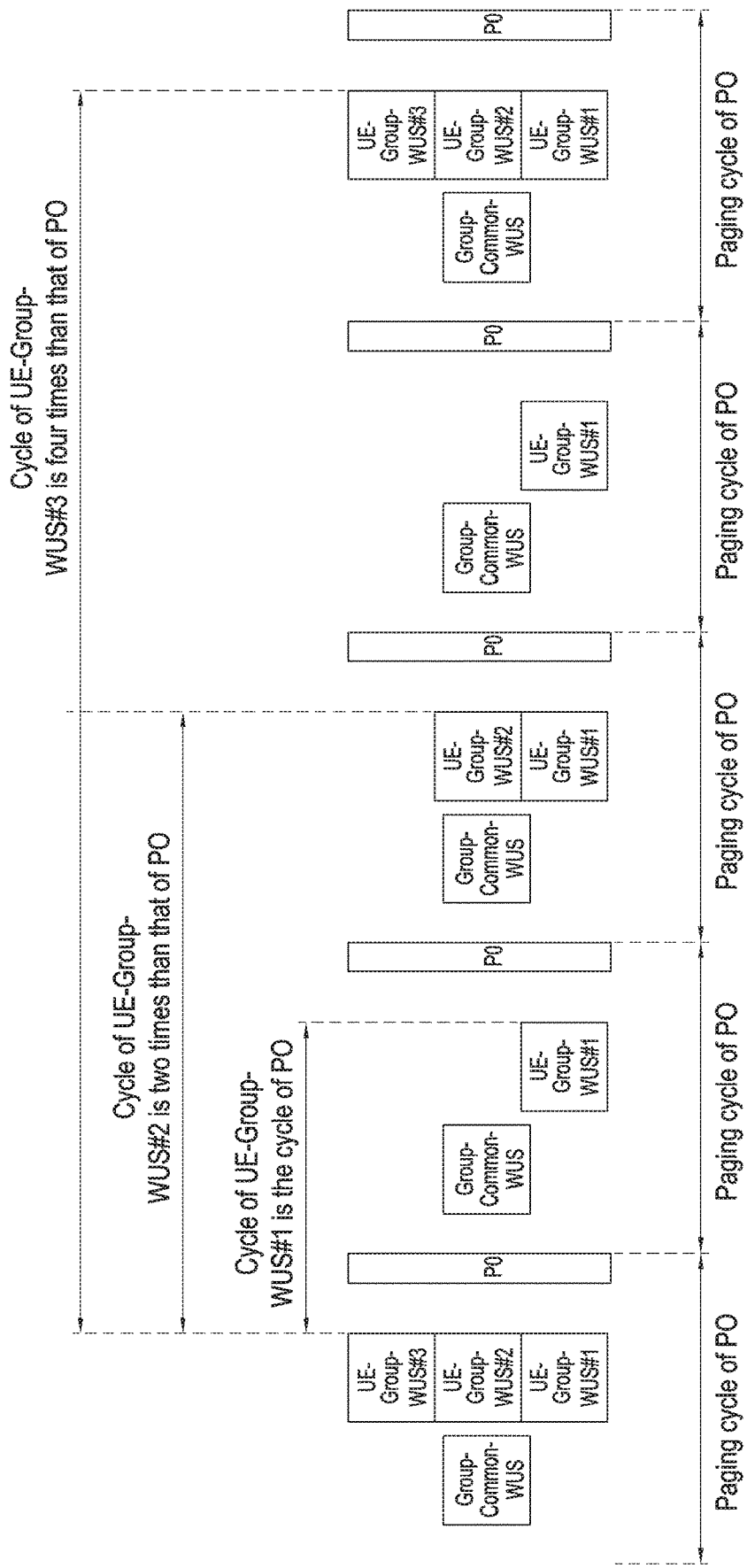
FIG. 17 illustrates a schematic diagram of determining to monitor the paging cycles of a common WUS and/or the WUS based on the UE group in another example of the present application.

As an example, as shown in FIG. 17, UE-Group-WUS #1, UE-Group-WUS #2, and UE-Group-WUS #3 represent WUSs corresponding to three UE groups, that is, UE-Group-based WUSs; one PO corresponds to one Group-Common WUS and three UE-Group-based WUSs, and the monitoring cycle of Group-Common WUS is the Default-pagingCycle, which is the paging cycle of the PO, for example, with a value of 640 ms; UE-Group-based WUS #1 corresponds to a group of UEs of which the UE-specific-pagingCycle is configured as 640 ms, and the monitoring cycle is equal to the PO paging cycle; UE-Group-based WUS #2 corresponds to a group of UEs of which the UE-specific-pagingCycle is configured as 1280 ms, and the monitoring cycle is twice of the PO paging cycle; UE-Group-based WUS #3 corresponds to a group of UEs of which the UE-specific-pagingCycle is configured as 2560 ms, and the monitoring cycle is four times than the PO paging cycle.

In this example, the UE-Group-based WUSs are grouped according to different values of the UE-specific-paging-Cycle. For example, it is assumed that there are at most four groups of UE-Group-based WUSs, which respectively correspond the UEs of which configuration values of the UE-specific-pagingCycle are {320, 640, 1280, 2560} ms. In a cell, whether the WUS corresponding to the PO being grouped based on the UE is related to the paging cycle of the PO, that is, for some POs, when the paging cycle of the PO is less than the Default-pagingCycle, the WUSs are not grouped based on the UE with adopting the Rel-15 WUS; for some POs, when the paging cycle of the PO is equal to the Default-pagingCycle, and the value configured by the Default-pagingCycle is not the maximum value allowed by the system, the WUSs are grouped based on the UE, with adopting the Rel-16 group WUS, and the Group-common WUS is introduced.

The UE determines whether the WUSs corresponding to the PO are grouped based on the UE according to the comparison between the configured value of the Default-pagingCycle and the paging cycle of the PO. If the paging cycle of the PO is less than the value of the Default-pagingCycle, the WUSs corresponding to the PO are not grouped based on UE, and there is no corresponding Group-CommonWUS, that is, the PO corresponds to only one WUS; if the PO paging cycle is equal to the value of Default-pagingCycle and the configured value is not the maximum value allowed by the system, the WUSs corresponding to the PO are grouped based on the UE and the PO also corresponds to the Group-CommonWUS, that is, the PO corresponds to one Group-CommonWUS and multiple group WUSs, such that the UE further determines the corresponding UE-group ID according to the configured value of the UE-specific-pagingCycle.

As an example, assuming that both the value range of the Default-pagingCycle and the UE-specific-pagingCycle is {320, 640, 1280, 2560} ms, if the PO paging cycle is 2560 ms, the WUS corresponding to the PO is not grouped based on the UE; if the paging cycle of the PO is 1280 ms and the Default-pagingCycle is equal to the paging cycle of the PO, the WUSs corresponding to the PO is divided into two groups, which correspond to a group of UEs of which the configuration values of UE-specific-pagingCycles being {1280, 2560} ms, respectively; if the paging cycle of the PO is 640 ms, and the Default-pagingCycle is equal to the paging cycle of the PO, the WUSs corresponding to the PO are divided into three groups, which correspond to a group of UEs of which the configuration values of UE-specific-pagingCycles being {640, 1280, 2560} ms, respectively; if the paging cycle of the PO is 320 ms, and the Default-pagingCycle is equal to the paging cycle of the PO, the WUSs corresponding to the PO are divided into four groups, which correspond to a group of UEs of which the configuration values of UE-specific-pagingCycles being {640, 1280, 2560} ms, respectively.

It may be understood that, in practical applications, the configuration value of the UE-specific-pagingCycle for the WUS group in this optional scheme may also be extended to other larger values.

In an optional implementation of the present application, the monitoring the common WUS includes:

determining the time domain location of the common WUS according to the time domain location of the WUS corresponding to the UE grouping;

monitoring the common WUS based on the time domain location of the common WUS; or, determining the time domain location and the frequency domain location of the common WUS according to the time domain location and the frequency domain location of the WUS corresponding to the UE group;

monitoring the common WUS based on the time domain location and frequency domain location of the common WUS.

In an optional implementation of the present application, the configuration information of the UE group WUS may further include the time domain location of the common WUS, or the time domain location and the frequency domain location of the common WUS, and in this case, the monitoring the WUS corresponding to the UE group to which the UE belongs may include:

determining the time domain location of the UE group to which the UE belongs according to the time domain location of the common WUS;

monitoring the WUS corresponding to the UE group to which the UE belongs according to the time domain location of the UE group to which the UE belongs;

or, determining the time domain location and the frequency domain location of the UE group to which the UE belongs according to the time domain location and the frequency domain location of the common WUS;

monitoring the WUS corresponding to the UE group to which the UE belongs according to the time domain location and the frequency domain location of the UE group to which the UE belongs.

In an optional solution, the time-frequency domain location of the Group-Common WUS may have no correlation with the time-frequency domain location of the UE-Group-based WUS, that is, the Group-Common WUS is respectively configured with a timeOffset and a freqLocation (for MTC). At this time, when the configuration information of the WUS further includes the time domain location and the frequency domain location of the common WUS, the UE may determine the time domain location and the frequency domain location of the common WUS directly based on the received the configuration information of the WUS.

In an optional solution, the time-frequency domain location of the Group-Common WUS has a certain correlation with the time-frequency domain location of the UE-Group-based WUS, and the UE may determine the time-frequency domain location of the UE-Group-based WUS by using the solutions described in the foregoing, and then determines the time-frequency domain location of the Group-Common WUS based on the time-frequency domain location of the UE-Group-based WUS.

In an optional solution, the Group-Common WUS may use the same time-frequency domain location as one of the multiple UE-Group-based WUSs. For example, the Group-Common WUS is transmitted by default in the first UE-Group-based WUS, and in addition to monitoring the time-frequency domain location of the UE-Group-based WUS corresponding to the UE group to which the UE belongs, the UE also determines the time-frequency domain of the first UE-Group-based WUS to monitor the Group-Common WUS. If the Group-Common WUS is not monitored, the UE-Group-based WUS is monitored in the time-frequency domain corresponding to the WUS of the UE group to which the UE belongs.

In an optional solution, when the Group-Common WUS and the UE-Group-based WUS occupy the same time-frequency domain location, the Group-Common WUS and the UE-Group-based WUS use the same WUS sequence, but are distinguished by different OCCs, that is, the CDM manner may be adopted between the Group-Common WUS and the UE-Group-based WUS.

In an optional solution, the sequence of the Group-Common WUS and the sequence of the UE-Group-based WUS may use different initialization seeds. For example, the sequences of the UE-Group-based WUS and the Group-Common WUS are generated respectively by the following initialization seeds $C_{init\_WUS}$ $$C_{init\_WUS} = \left(N_{ID}^{cell} + 1\right)\left(\left((N_{max}^{WUS} + 1) * 10 n_{f\_start\_P0} + (N_{max}^{WUS} + 1) * \left\lfloor \frac{n_{s\_start\_P0}}{2} \right\rfloor + N_{ID}^{WUS}\right) \mod 2048 + 1\right)2^9 + N_{ID}^{cell}$$

and $$C_{init\_WUS} = \left(N_{ID}^{cell} + 1\right)\left(\left((N_{max}^{WUS} + 1) * 10 n_{f\_start\_P0} + (N_{max}^{WUS} + 1) * \left\lfloor \frac{n_{s\_start\_P0}}{2} \right\rfloor + N_{max}^{WUS}\right) \mod 2048 + 1\right)2^9 + N_{ID}^{cell}$$

In the formulas, $N_{ID}^{cell}$ indicates the physical ID of the cell, $n_{f\_start\_P0}$ indicates the starting radio frame index of the corresponding PO, $n_{s\_start\_P0}$ indicates the starting timeslot index of the corresponding PO, $C_{ID}^{WUS}$ indicates the ID of the group WUS, that is, the ID of the WUS corresponding to the group UE, of which the value ranges from 0 to $N_{max}^{WUS}-1$, $N_{max}^{WUS}$ is the maximum number of group WUSs supported by the system, and mod represents the modulo operation.

In an optional solution, the default frequency domain locations of the Group-Common WUS and the UE-Group-based WUS may be identical. The TDM is used between the Group-Common WUS and the multiple UE-Group-based WUSs, and the Group-Common WUS is before the multiple UE-Group-based WUSs, which are consecutive in the time domain; the time domain location of the Group-Common WUS may be calculated from the time domain location and the maximum duration of the latest UE-Group-based WUS.

In an optional solution, the TDM is used between the Group-Common WUS and multiple UE-Group-based WUSs, which are not consecutive in time. There is an interval between the Group-Common WUS and the nearest UE-Group-based WUS, which is a value prescribed by the system standard or configured in the cell system information.

In an optional solution, the time domain locations of the Group-Common WUS and the UE-Group-based WUS are identical by default. The FDM are used between the Group-Common WUS and the multiple UE-Group-based WUS s, which are consecutive in the frequency domain, and then the frequency domain location of the Group-Common WUS may be calculated from the frequency domain location and the WUS bandwidth of the latest UE-Group-based WUS.

In an optional solution, when the time domain location and the frequency domain location of the common WUS are known, the time domain location and frequency location of the WUS corresponding to each UE group may also be obtained according to the time domain location and the frequency domain location of the common WUS. That is, the time domain location and/or the frequency domain location of the Group-Common WUS may be obtained according to the time domain location and/or the frequency domain location of the UE-Group-based WUS, or the time domain location and/or the frequency domain location of the UE-Group-based WUS may be obtained according to the time domain location and/or the frequency domain location of the Group-Common WUS.

According to the description of the foregoing optional solutions, if the system (such as a base station) prescribes that the time-frequency domain location of the Group-Common WUS has a certain correlation with the time-frequency domain location of the UE-Group-based WUS, the time-frequency domain location of the UE-Group-based WUS may be determined based on the time-frequency domain location of the Group-Common WUS, and the time-frequency domain location of the UE-Group-based WUS may also be obtained based on the time-frequency domain location of the Group-Common WUS, according to the specific correspondence of the system.

Optionally, the CDM multiplexing manner is adopted between the Group-Common WUS and the UE-Group-based WUS as well as between the multiple UE-Group-based WUSs, that is, the Group-Common WUS and the multiple UE-Group-based WUSs use the same time-frequency resource, which are distinguished by different OCCs. The advantage of this example is that when the UE detects the UE-Group-based WUS after having not detected the Group-Common WUS, it may reuse some operations in the process of detecting the Group-Common WUS, such as the filtering process of the received signal, thereby reducing the detection complexity and power consumption of the UE.

Figure 18:
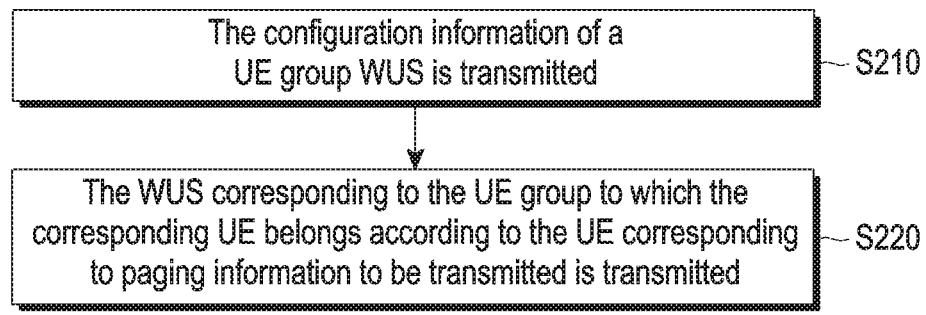
FIG. 18 illustrates a schematic flowchart of a method for transmitting a wake-up signal according to an embodiment of the present application.

FIG. 18 illustrates a schematic flowchart of a method for transmitting a wake-up signal according to an embodiment of the present application, which is performed by a base station, and as shown in FIG. 18, the method may include:

Step S210: the configuration information of a UE group WUS is transmitted;

Step S220: the WUS corresponding to the UE group to which the corresponding UE belongs according to the UE corresponding to paging information to be transmitted is transmitted.

In the method for transmitting the wake-up signal provided by the embodiment of the present application, the base station may transmit the configuration information of the UE group WUS to each UE, so that each UE that receives the group configuration information may determine the WUS corresponding to the UE group to which the UE belongs according to the configuration information, and therefore, the UE may only monitor the WUS corresponding to the UE group to which the UE belongs, without monitoring the WUS during the entire paging cycle, thereby reducing the power consumption of the UE. Based on the method, when the base station needs to transmit the paging information to some paged UE(s), the base station may only transmit the WUS corresponding to the UE group including the paged UE(s), without transmitting all WUSs, thereby saving the system resources of the base station, avoiding transmitting the WUS to an unnecessary UE and waking up the unnecessary UE, and reducing the power consumption of the UE.

In an optional implementation of the present application, in step S220, the transmitting the WUS corresponding to the UE group to which the corresponding UE belongs according to the UE corresponding to paging information to be transmitted, may include:

transmitting the WUS corresponding to the UE group to which the corresponding UE belongs according to the UE corresponding to the paging information to be transmitted, when the paging message of the RAN side is not included in the paging information;

In an optional implementation of the present application, when the paging message of the RAN side is included in the paging information, the method may further include:

transmitting the common WUS corresponding to all UEs.

In practical applications, If the paging channel includes a paging message from the RAN side, all UEs corresponding to the paging channel should decode the paging channel, and the WUS based on the UE group may consume more system resources due to that each group WUS is transmitted to wake up the corresponding group of UEs. To save system resources, a common WUS (Group-Common WUS) that all UEs need to monitor may be introduced, so that when the paging channel includes the paging message from the RAN side, the base station may only transmit the Group-Common WUS without transmitting all the group WUSs, and the time-frequency resource originally reserved for the group WUS may be used by the base station for other purposes, thereby improving the efficiency of using system resources. If the paging channel only includes a paging message from the CN side, this paging channel is meaningless to other UEs other than the paged UE, and the power consumption of the other UEs used to monitor and receive the paging channel is actually unnecessary. Consequently, at this time, the WUS may be transmitted only to the UE group to which the UE that needs to be paged belongs without being transmitted to another UE group other than the UE group to which the paged UE belongs, thereby avoiding that these UEs waste unnecessary power consumption.

It may be understood that the method for transmitting the wake-up signal shown in FIG. 1 and the method for transmitting the wake-up signal shown in FIG. 18 in the embodiments of the present application are methods for transmitting the wake-up signal corresponding to the UE side and the base station side. The execution body of the method shown in FIG. 1 may be a UE, the execution body of the method shown in FIG. 18 may be a base station, and the principles of the two methods are identical. It is clear to those skilled in the art, a detailed interpretation and description of the method shown in FIG. 18 may referred to the above method shown in FIG. 1 or the optional solutions of the method shown in FIG. 1, which are not described herein.

Figure 19:
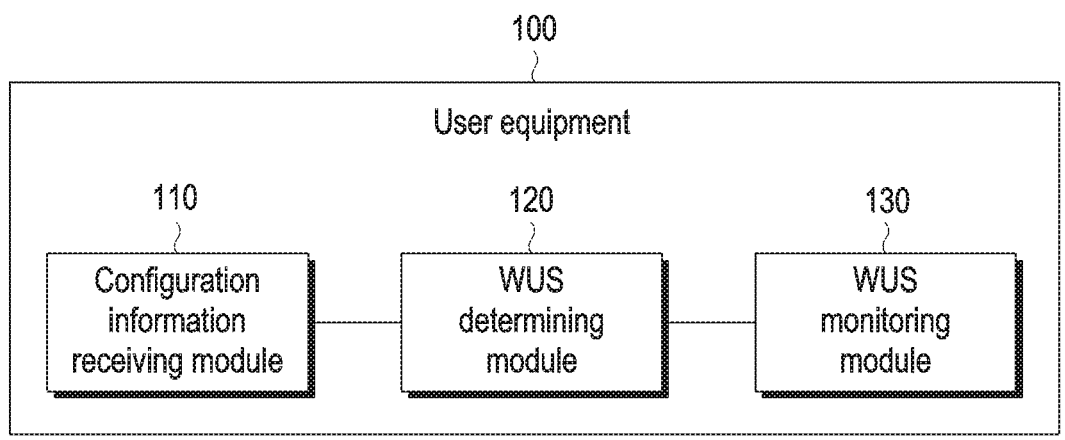
FIG. 19 illustrates a schematic structural diagram of a user equipment according to an embodiment of the present application.

Based on the same principle as the method for transmitting the wake-up signal shown in FIG. 1, the embodiment of the present application further provides a user equipment. As shown in FIG. 19, the user equipment 100 may include a configuration information receiving module 110 and a WUS determining module 120 and WUS monitoring module 130.

The configuration information receiving module 110 is configured to receive configuration information of a UE group WUS;

the WUS determining module 120 is configured to determine the WUS corresponding to the UE group to which the UE belongs according to the configuration information of the UE group WUS;

the WUS monitoring module 130 is configured to monitor the WUS corresponding to the UE group to which the UE belongs.

In an optional implementation of the present application, the configuration information of the UE group WUS includes the number of the UE groups, and the WUS determining module 120 may be specifically configured to:

determine the WUS corresponding to the UE group to which the UE belongs according to the number of the UE groups.

Optionally, the number of the UE groups includes at least one of the following:

the number of the group WUSs corresponding to the discontinuous reception mode;

the number of the group WUSs corresponding to a time offset type, wherein the time offset is the time interval between the WUS and the corresponding paging occasion (PO).

Optionally, if the number of the UE groups includes the number of the WUS groups corresponding to the time offset type, when determining the WUS corresponding to the UE group to which the UE belongs according to the number of UE groups, the WUS determining module 120 is specifically configured to:

determining the number of the group WUSs corresponding to the UE according to the time offset type corresponding to the UE;

determining the WUS corresponding to the UE group to which the UE belongs according to the number of the group WUSs corresponding to the UE.

Optionally, the configuration information of the UE group WUS comprises time domain location indicating information of a WUS corresponding to at least one UE group, or time domain location indicating information and frequency domain location indicating information of the WUS corresponding to at least one UE group.

Optionally, the configuration information of the UE group WUS further comprises indicating information of a WUS grouping manner, and when determining the WUS corresponding to the UE group to which the UE belongs according to the number of the UE group WUSs, the WUS determining module 120 is specifically configured to:

determine the WUS corresponding to the UE group to which the UE belongs according to the indicating information of the WUS grouping manner and the number of the UE groups.

Optionally, the WUS grouping manner includes at least one of the following:

grouping based on a UE ID;
grouping based on a UE network coverage level;
grouping based on a UE group configuration parameter;
grouping based on a time offset type;
grouping based on a discontinuous reception mode.

Optionally, the user equipment 100 may further include:

a WUS overlap processing module, configured to determine whether there is an overlap between the WUS corresponding to the UE group to which the UE belongs and the WUS corresponding to another UE group, and/or whether there is an overlap between the WUS corresponding to the UE group to which the UE belongs and the WUS corresponding to the ungrouped UE, and if there is an overlap, process on the WUS of the overlap is performed correspondingly according to a pre-configured overlap processing strategy when monitoring the WUS corresponding to the UE group to which the UE belongs.

Optionally, the WUS monitoring module 130 may be specifically configured to:

monitor a common WUS in each paging cycle of the PO, wherein the common WUS is a WUS that all UEs need to monitor; monitor the WUS corresponding to the UE group to which the UE belongs when the common WUS is not monitored in the paging cycle; monitor the PO corresponding to the paging cycle when the common WUS is monitored in the paging cycle.

Optionally, the user equipment 100 may further include:

a first monitoring cycle receiving module, configured to receive the monitoring cycle of the common WUS;

At this time, the WUS monitoring module 130 may be specifically used to:

determine the paging cycle including the WUS corresponding to the UE group to which the UE belongs, and/or the paging cycle including the common WUS according to the monitoring cycle of the common WUS and the paging cycle of the PO, when the paging cycle of the PO is different from the monitoring cycle of the common WUS;

monitor the WUS corresponding to the UE group to which the UE belongs and/or monitor the common WUS in the corresponding paging cycle according to the paging cycle including the WUS corresponding to the UE group to which the UE belongs, and/or the paging cycle including the common WUS.

Optionally, the user equipment further includes:

a second monitoring cycle receiving module, configured to receive the monitoring cycle of the common WUS and receive the monitoring cycle of the WUS corresponding to the UE group to which the UE belongs.

At this time, the WUS monitoring module 130 may be specifically used to:

determine the paging cycle including the WUS corresponding to the UE group to which the UE belongs, and/or the paging cycle including the common WUS according to the paging cycle of the PO, the monitoring cycle of the common WUS, and the monitoring cycle of the WUS corresponding to the UE group to which the UE belongs;

monitor the WUS corresponding to the UE group to which the UE belongs and/or monitoring the common WUS in the corresponding paging cycle according to the paging cycle including the WUS corresponding to the UE group to which the UE belongs, and/or the paging cycle including the common WUS.

Optionally, when the WUS monitoring module 130 monitors the common WUS, the WUS monitoring module 130 may be specifically configured to:

determine the time domain location of the common WUS according to the time domain location of the WUS corresponding to the UE grouping;

monitor the common WUS based on the time domain location of the common WUS; or, determine the time domain location and the frequency domain location of the common WUS according to the time domain location and the frequency domain location of the WUS corresponding to each UE group;

monitor the common WUS based on the time domain location and frequency domain location of the common WUS.

Optionally, the configuration information of the UE group WUS may further include the time domain location of the common WUS, or the time domain location and the frequency domain location of the common WUS, and in this case, when monitoring the WUS corresponding to the UE group to which the UE belongs, the WUS monitoring module 130 may be specifically configured to:

determine the time domain location of the UE group to which the UE belongs according to the time domain location of the common WUS; monitor the WUS corresponding to the UE group to which the UE belongs according to the time domain location of the UE group to which the UE belongs;

or, determine the time domain location and the frequency domain location of the UE group to which the UE belongs according to the time domain location and the frequency domain location of the common WUS; monitor the WUS corresponding to the UE group to which the UE belongs according to the time domain location and the frequency domain location of the UE group to which the UE belongs.

In an optional implementation of the application, the method may further include:

a plurality of the WUSs are multiplexed by the CDM on the same time-frequency domain resource (hereinafter referred to as WUS CDM), wherein, for example, a plurality of the WUSs are generated by multiplying the same WUS sequence by different orthogonal cover codes (OCCs), or generated by performing different cyclic shifts on the same one WUS sequence. The UE monitors the WUS on the configured time-frequency domain resource, and determines whether to further monitor the corresponding PO according to whether the OCC (or Cyclic Shift) used by the monitored WUS is the OCC (or Cyclic Shift) corresponding to the UE.

In an optional solution, in N(N≥2) OCCs (or Cyclic Shifts) for the WUS CDM, each OCC (or Cyclic Shift) corresponds to a group of UEs, the WUS corresponding to each OCC (or Cyclic Shift) may be referred to as the UE-group WUS, and there is no overlap between the two groups of UEs corresponding to any two OCCs (or Cyclic Shifts), that is, all UEs corresponding to the PO are divided into N groups; the UE may determine the unique OCC (or Cyclic Shift) corresponding to the UE according to the predefined grouping method, and the UE determines the serial number of the corresponding OCC (or Cyclic Shift) according to the Group ID of the group in which the UE is located.

Herein, the UE only needs to monitor its corresponding UE-group WUS. The UE only monitors the corresponding PO when monitoring the WUS that uses the OCC (or Cyclic Shift) corresponding to the UE. If the UE has not monitored the WUS, or the monitored WUS uses other OCCs (i.e., other UE-group WUSs), the UE should return to sleep mode without monitoring the corresponding PO.

In an optional solution, in N OCCs (or Cyclic Shifts) for the WUS CDM, wherein N−1 OCCs (or Cyclic Shifts) correspond to a group of UEs, and the WUS corresponding to the N−1 OCCs (or Cyclic shifts) may be referred to as a UE-group WUS, and there is no overlap between the two groups of UEs corresponding to any two OCCs (or Cyclic Shifts) of the N−1 OCCs (or Cyclic Shifts), that is, all UEs corresponding to the PO are divided into N−1 groups. In addition, all the UEs corresponding to the PO correspond to another OCC (or Cyclic Shift) except for the N−1 OCCs (or Cyclic Shifts), and the WUS corresponding to this OCC (or Cyclic Shift) may be referred to as a Group-common WUS. In other words, the CDM is used between multiple UE-group WUSs, as well as between the UE-group WUS and the Group-common WUS.

Herein, the UE should monitor the UE-group WUS and the Group-common WUS. When the UE has monitored the UE-group WUS corresponding to the group in which the UE located, or has monitored the Group-common WUS, the UE should further monitor the corresponding PO. If the UE has not monitored the WUS, or the WUS monitored by the UE is another UE-Group WUS, UE should return to sleep mode without monitoring the corresponding PO.

Optionally, the Group-common WUS is a WUS of the Rel-15 system, that is, the Group-common WUS is also monitored by the Rel-15 UE. In other words, the CDM is used between the Rel-16 UE-group WUSs, as well as between the Rel-16 UE-group WUS, and the Rel-15 WUS; the UE with the Rel-16 UE-group WUS capability should monitor the Rel-15 WUS (i.e., Rel-16 Group-common WUS) in addition to the Rel-16 UE-group WUS; the Rel-16 UE should interpret the configuration information of the Rel-15 WUS and monitor the Rel-16 UE-group WUS in the time-frequency domain of the Rel-15 WUS; the Rel-16 UE-group WUS is generated by additionally using the OCC (or Cyclic Shift) processing on Rel-15 WUS.

Optionally, the network may configure whether the above Group-common WUS is the WUS of the Rel-15 system. If the Group-common WUS is configured as the WUS of the Rel-15 system, the Rel-16 WUS and the Rel-15 WUS are multiplexed with CDM, that is, the Rel-16 WUS and Rel-15 WUS use the same time-frequency resource, and the UE with Rel-16 UE-group WUS capability should monitor the Rel-15 WUS in addition to the Rel-16 UE-group WUS; if the Group-common WUS is not configured as the WUS of the Rel-15 system, the Rel-16 WUS and the Rel-15 WUS are multiplexed with TDM, and the UE with the Rel-16 UE-group WUS capability should monitor the Rel-16 Group-Common WUS in addition to the Rel-16 UE-group WUS.

Optionally, if the base station wants to page a certain UE in a certain group of UEs (for example, Group-i), the base station will transmit a UE-group WUS corresponding to the group in which the UE is located; if the base station wants to page a certain UE in a certain group of UEs (for example, Group-i) and a UE in another group of UEs (for example, Group-j), the base station will transmit the Group-common WUS. At the same time, if there are more than two (including 2) groups of UEs that need to be paged, the base station should transmit a Group-common WUS, that is, the base station will only transmit one WUS at most on the time-frequency domain resource of the WUS.

In an optional solution, all UEs corresponding to the PO are divided into N sub-groups, and in the multiple OCCs (or Cyclic Shifts) for the WUS CDM, each OCC (or Cyclic Shift) in a part of OCCs (or Cyclic Shifts) corresponds to a sub-group of UEs, and the WUS using this part of OCCs (or Cyclic Shifts) is referred to as the UE-group WUS; each OCC (or Cyclic Shift) of another part of OCCs (or Cyclic Shifts) corresponds to X sub-groups of UE, wherein X ranges from 2 to N−1, and the WUS using this part of the OCC (or Cyclic Shift) is referred to as the UE-group WUS. In addition, there is another case that an OCC (or Cyclic Shift) corresponds to all sub-groups of UEs (N sub-groups), that is, all UEs corresponding to the PO correspond to this OCC (or Cyclic Shift), and the WUS using the OCC (or Cyclic Shift) is referred to as the Group-common WUS.

The number of OCCs (or Cyclic Shifts) used for the UE-group WUS is N, the maximum number of OCCs (or Cyclic Shifts) used for the UE-groups WUS is $$\sum_{j=2}^{N-1} \frac{N(N-1)(N-2) \dots (N-j+1)}{j},$$

the number of OCCs (or Cyclic Shifts) used for the Group-common WUS is 1.

Herein, the UE should monitor the UE-group WUS, the UE-groups WUS and the Group-common WUS. When the UE has monitored the corresponding UE-group WUS, UE-groups WUS or Group-common WUS thereof, the UE should further monitor the corresponding PO. If the UE has not monitored the WUS, or the monitored WUS is another UE-group WUS or another UE-groups WUS, the UE should return to sleep mode without monitoring the corresponding PO.

It may be understood that each module of the user equipment in the embodiment of the present application may have a function of implementing corresponding steps of the method for transmitting the wake-up signal shown in FIG. 1 in the embodiment of the present application or the method according to the method embodiment of FIG. 1. Wherein, the function may be implemented by hardware, or may be implemented by hardware by executing corresponding software. Each of the above modules may be software and/or hardware, wherein each module may be implemented respectively, or implemented by integrating multiple modules. The detailed description of the function of each module of the user equipment may be referred to the corresponding description in the foregoing corresponding method embodiment, which are not described herein again.

Figure 20:
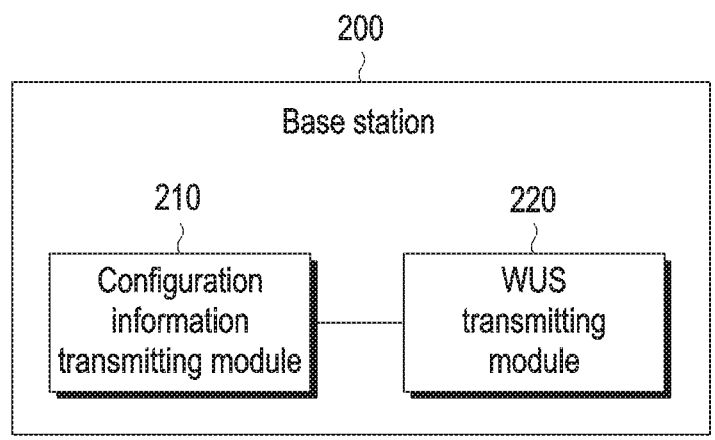
FIG. 20 illustrates a schematic structural diagram of a base station according to an embodiment of the present disclosure.

Based on the same principle as the method for transmitting a wake-up signal shown in FIG. 18, the embodiment of the present application further provides a base station. As shown in FIG. 20, the base station 200 may include a configuration information transmitting module 210 and a WUS transmitting module 220.

The configuration information transmitting module 210 is configured to transmit the configuration information of the UE group WUS;

the WUS transmitting module 220 is configured to transmit the WUS corresponding to the UE group to which the corresponding UE belongs according to the UE corresponding to paging information to be transmitted.

Optionally, the WUS transmitting module 220 may be specifically configured to:

transmit the WUS corresponding to the UE group to which the corresponding UE belongs according to the UE corresponding to the paging information to be transmitted, when the paging message of the RAN side is not included in the paging information.

In an optional implementation manner of the present application, the WUS transmitting module 220 may be further configured to transmit the common WUS corresponding to all UEs when the paging message of the RAN side is included in the paging information.

Similarly, each module of the base station in the embodiment of the present application may have a function of implementing corresponding steps in the method for transmitting the wake-up signal of the embodiment of the present application of FIG. 18 or based on FIG. 18. Wherein, the function may be implemented by hardware, or may be implemented by hardware by executing corresponding software. Each of the above modules may be software and/or hardware, wherein each module may be implemented respectively, or implemented by integrating multiple modules. The detailed description of the function of each module of the base station may be referred to the corresponding description in the foregoing corresponding method embodiment, which are not described herein again.

Figure 21:
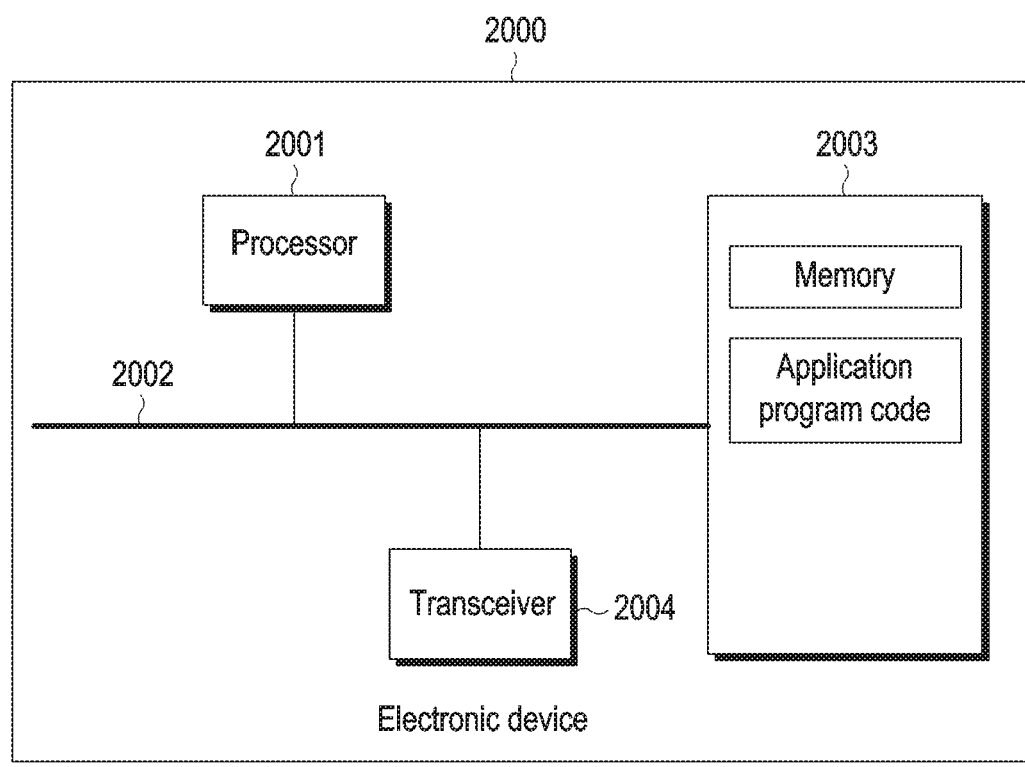
FIG. 21 illustrates a schematic structural diagram of an electronic device according to an embodiment of the present application.

The embodiment of the present application provides an electronic device. As shown in FIG. 21, the electronic device 2000 shown in FIG. 21 includes a processor 2001 and a memory 2003. Wherein, the processor 2001 is connected to the memory 2003, for example, through the bus 2002. Optionally, the electronic device 2000 may further include a transceiver 2004. It should be noted that, in actual applications, the transceiver 2004 is not limited to one, and the structure of the electronic device 2000 does not constitute a limitation on the embodiments of the present application.

In actual applications, the electronic device 2000 may be specifically implemented as a user equipment or a base station.

Wherein, the processor 2001 is used in the embodiment of the present application to implement the functions of each module in the user equipment shown in FIG. 19 or the base station shown in FIG. 20. The transceiver 2004 includes a receiver and a transmitter. The transceiver 2004 is used in the embodiment of the present application to implement communication between the electronic device 2000 and other devices, to implement data reception and transmission.

The processor 2001 may be a CPU, a general purpose processor, a DSP, an ASIC, an FPGA or another programmable logic device, a transistor logic device, a hardware component, or any combination thereof. It is possible to implement or perform the various illustrative logical blocks, modules and circuits described in conjunction with the contents disclosed in the present application. The processor 2001 may also be a combination for implementing computing functions, such as one or more microprocessor combinations, a combination of a DSP and a microprocessor, and the like.

The bus 2002 may include a path for communicating information between the above components. The bus 2002 may be a PCI bus, an EISA bus or the like. The bus 2002 may be divided into an address bus, a data bus, a control bus, and the like. For convenience of representation, only one thick line in FIG. 21 is used to represent the bus, but it does not mean that there is only one bus or one type of bus.

The memory 2003 may be a ROM or another type of static storage device that may store static information and instructions, or an RAM or another type of dynamic storage device that may store information and instruction, and may also be an EEPROM, a CD-ROM or another optical disc storage, optical disc storage (including compression optical disc, laser disc, optical disc, digital versatile disc, Blu-ray discs, etc.), a magnetic disk storage medium or another magnetic storage device, or any other medium that may be used to carry or store desired program codes in form of instruction or data structure and may be accessed by the computer, which is not limited thereto.

Optionally, the memory 2003 is used to store application program codes for executing the solution of the present application, and is controlled by the processor 2001 for execution. The processor 2001 is configured to execute the application program codes stored in the memory 2003 to implement the actions of the user equipment or base station provided by the embodiments of the present application.

The embodiment of the present disclosure provides a computer readable storage medium, wherein the computer readable storage medium stores a computer program thereon, and the computer program, when executed by a processor, implements the method for transmitting the wake-up signal shown in any embodiment of the present application.

It should be understood that although the various steps in the flowchart of the drawings are sequentially displayed as indicated by the arrows, these steps are not necessarily performed in the order indicated by the arrows. Unless explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different times, and the order of execution thereof is not necessarily to be performed sequentially, but may be performed by turns or alternately with at least a portion of the sub-steps or stages of other steps, or other steps.

The descriptions hereinabove are only part of embodiments of the present application. It should be pointed out that those skilled in the art, under the circumstance without deviating from the principle of the present application, may also make several improvements and modifications, where these improvements and modifications should also be deemed falling within the protection scope of the present application.

What is claimed is:

1. A method for monitoring a wake-up signal (WUS) by a user equipment (UE), the method comprising:
    receiving first information on a UE group WUS and second information on a common WUS in a system information block (SIB);
    determining a first paging cycle and the UE group WUS corresponding to a UE group to which the UE belongs among a plurality of UE groups based on the first information;
    determining a maximum duration for monitoring the UE group WUS based on a value corresponding to a ratio configured in the first information;
    determining a second paging cycle based on a monitoring cycle of the common WUS included in the second information and a third paging cycle of paging occasion (PO);
    monitoring the common WUS which is used to wake up all UEs monitoring a same WUS resource based on the second paging cycle;
    in response to detecting the common WUS, monitoring at least one first PO based on the third paging cycle;
    in response to not detecting the common WUS, monitoring the UE group WUS based on the maximum duration and the first paging cycle; and
    in response to detecting the UE group WUS, monitoring at least one second PO based on the third paging cycle.

2. The method of claim 1, wherein the common WUS is configured to be a non-legacy WUS.

3. The method of claim 1,
    wherein the first information includes information on a number of the plurality of UE groups, and
    wherein the number of the plurality of UE groups is associated to a gap between the UE group WUS and the at least one second PO.

4. The method of claim 3, wherein the number of the plurality of UE groups is configured for each of a discontinuous reception (DRX) UE and an extended discontinuous reception (eDRX) UE.

5. The method of claim 1, wherein a plurality of WUSs are multiplexed by code division multiplexing (CDM) on WUS resource associated with the UE group WUS.

6. The method of claim 1,
    wherein the UE group is grouped based on a UE identity (ID), and
    wherein an ID of the UE group is used as a parameter to generate WUS sequence.

7. The method of claim 1, wherein the determining the UE group WUS comprises:
    determining applicable gap between a WUS resource associated with the UE group WUS and the at least one second PO based on the first information;
    selecting at least one WUS set comprising the UE group WUS based on the determined applicable gap; and
    selecting the UE group WUS based on the at least one selected WUS set.

8. A user equipment (UE) for monitoring a wake-up signal (WUS), the UE comprising:
    a transceiver; and
    a processor configured to:
        control the transceiver to receive first information on a UE group WUS and second information on a common WUS in a system information block (SIB),
        determine a first paging cycle and the UE group WUS corresponding to a UE group to which the UE belongs among a plurality of UE groups based on the first information,
        determine a maximum duration for monitoring the UE group WUS based on a value corresponding to a ratio configured in the first information,
        determine a second paging cycle based on a monitoring cycle of the common WUS included in the second information and a third paging cycle of paging occasion (PO),
        monitor the common WUS which is used to wake up all UEs monitoring a same WUS resource based on the second paging cycle,
        in response to the common WUS being detected, monitor at least one first PO based on the third paging cycle,
        in response to the common WUS not being detected, monitor the UE group WUS based on the maximum duration and the first paging cycle, and
        in response to the UE group WUS being detected, monitoring at least one second PO based on the third paging cycle.

9. The UE of claim 8,
    wherein the first information includes information on a number of the plurality of UE groups, and
    wherein the number of the plurality of UE groups is associated to a gap between the UE group WUS and the at least one second PO.

10. The UE of claim 9, wherein the number of the plurality of UE groups is configured for each of a discontinuous reception (DRX) UE and an extended discontinuous reception (eDRX) UE.

11. The UE of claim 8, wherein a plurality of WUSs are multiplexed by code division multiplexing (CDM) on WUS resource associated with the UE group WUS.

12. The UE of claim 8,
    wherein the UE group is grouped based on a UE identity (ID), and
    wherein an ID of the UE group is used as a parameter to generate WUS sequence.

13. The UE of claim 8, wherein the processor is configured to:
    determine applicable gap between a WUS resource associated with the UE group WUS and the at least one second PO based on the first information,
    select at least one WUS set comprising the UE group WUS based on the determined applicable gap, and
    select the UE group WUS based on the at least one selected WUS set.

* * * * *